United States Patent
Mitsunaga et al.

(10) Patent No.: US 7,492,543 B2
(45) Date of Patent: Feb. 17, 2009

(54) CONTROL DEVICE, CONTROL METHOD, AND STORAGE APPARATUS FOR CONTROLLING READ HEAD AND WRITE HEAD CLEARANCE

(75) Inventors: Nobuyuki Mitsunaga, Kawasaki (JP); Masahide Kanegae, Kawasaki (JP); Hiroyuki Tanaka, Kawasaki (JP); Isamu Tomita, Kawasaki (JP); Masao Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 11/895,464

(22) Filed: Aug. 24, 2007

(65) Prior Publication Data

US 2008/0100950 A1    May 1, 2008

(30) Foreign Application Priority Data

Oct. 31, 2006    (JP)    ............................. 2006-295375

(51) Int. Cl.
 *G11B 21/02*    (2006.01)
(52) U.S. Cl. ...................................................... 360/75
(58) Field of Classification Search ................ None
 See application file for complete search history.

(56) References Cited

U.S. PATENT DOCUMENTS 7,088,545 B1 *    8/2006    Singh et al. .................... 360/75
7,426,090 B2 *    9/2008    Yamashita et al. ............. 360/75
2007/0230034 A1*    10/2007    Kondo ........................ 360/78.04
2007/0268605 A1*    11/2007    Ryu ............................. 360/31

FOREIGN PATENT DOCUMENTS

| JP | 05-020635 | 1/1993 |
| JP | 2004-079126 | 3/2004 |
| JP | 2005-071546 | 3/2005 |
| JP | 2005-276284 | 10/2005 |
| WO | WO 02/37480 | 5/2002 |

* cited by examiner

*Primary Examiner*—Jason C Olson
(74) *Attorney, Agent, or Firm*—Greer, Burns & Crain, Ltd.

(57) ABSTRACT

Upon recording, a clearance control unit performs preheating by an added control value (BR) of a base heater control value B and an adjustment heater control value R and switches that to value B when it reaches a target sector to perform write. Upon reproduction, preheating is performed by the value (BR) and the value (BR) is maintained when it reaches a target sector to perform read. A correction processing unit detects contact between the head and a medium surface while increasing the value R from a predetermined initial value Ro, and sets a new calculated base heater control value B, and value Ro as the adjustment heater control value R. Write assist adjustment in which the measured adjustment heater control value R is adjusted to a heater control value that improves characteristic deterioration immediately after recording is started wherein preheating is switched to write heating is performed.

20 Claims, 23 Drawing Sheets

FIG. 4

| HEAD | ZONE | BASE HEATER CONTROL VALUE B | ADJUSTMENT HEATER CONTROL VALUE R |
|---|---|---|---|
| HH1 | Z1 | B11 | R11 |
| | Z2 | B12 | R12 |
| | Z3 | B13 | R13 |
| | Z4 | B14 | R14 |
| | ⋮ | ⋮ | ⋮ |
| | Zn | B1n | R1n |
| HH2 | Z1 | B21 | R21 |
| | Z2 | B22 | R22 |
| | Z3 | B23 | R23 |
| | Z4 | B24 | R24 |
| | ⋮ | ⋮ | ⋮ |
| | Zn | B2n | R2n |

50

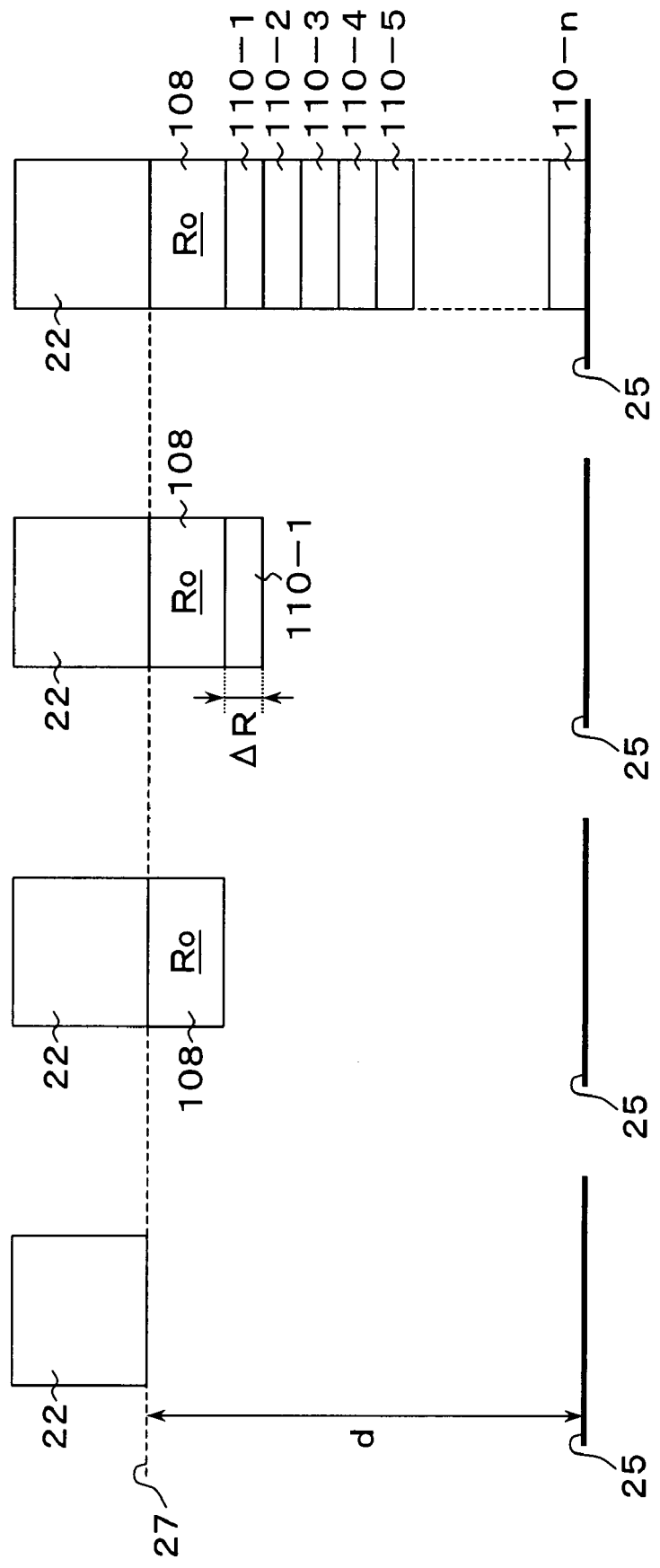

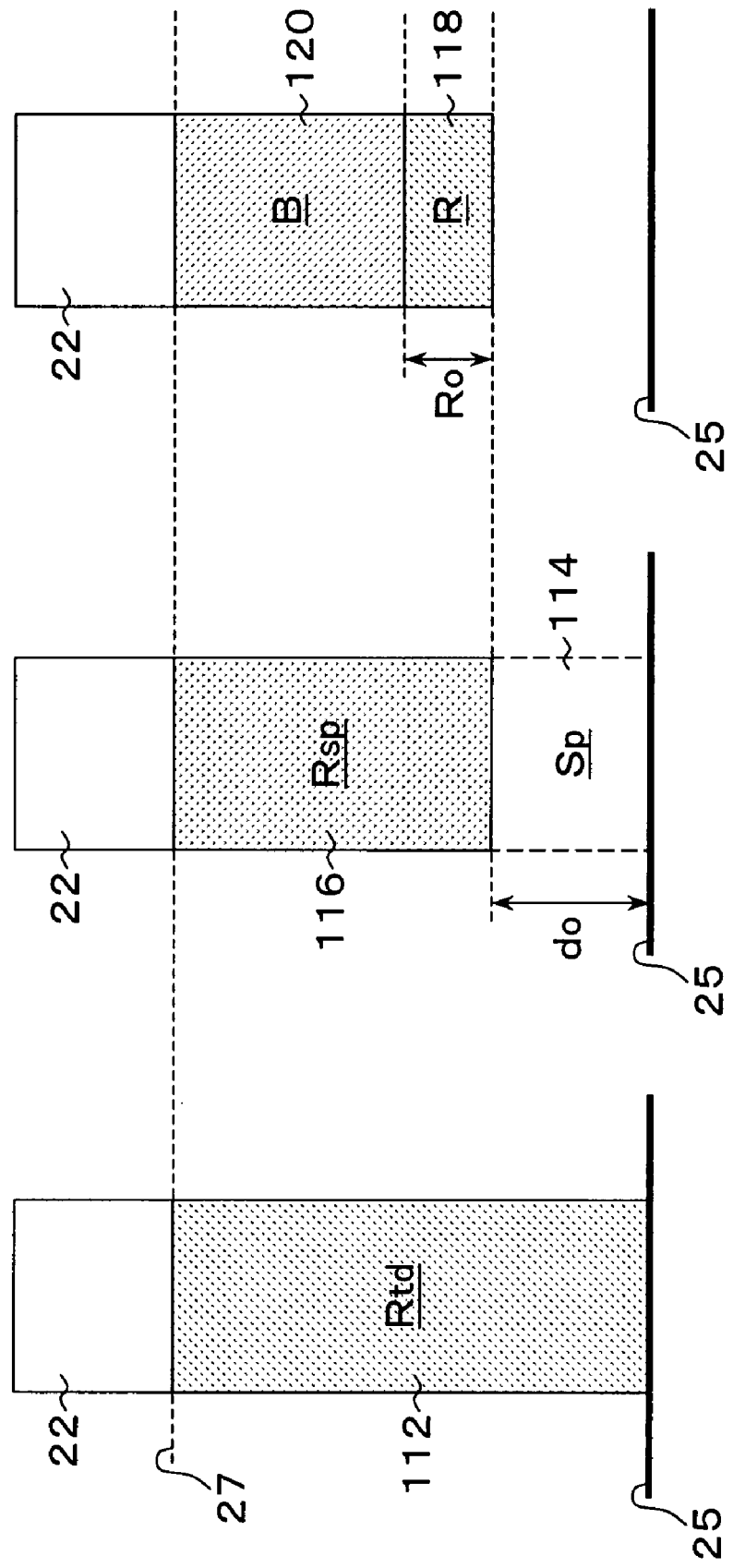

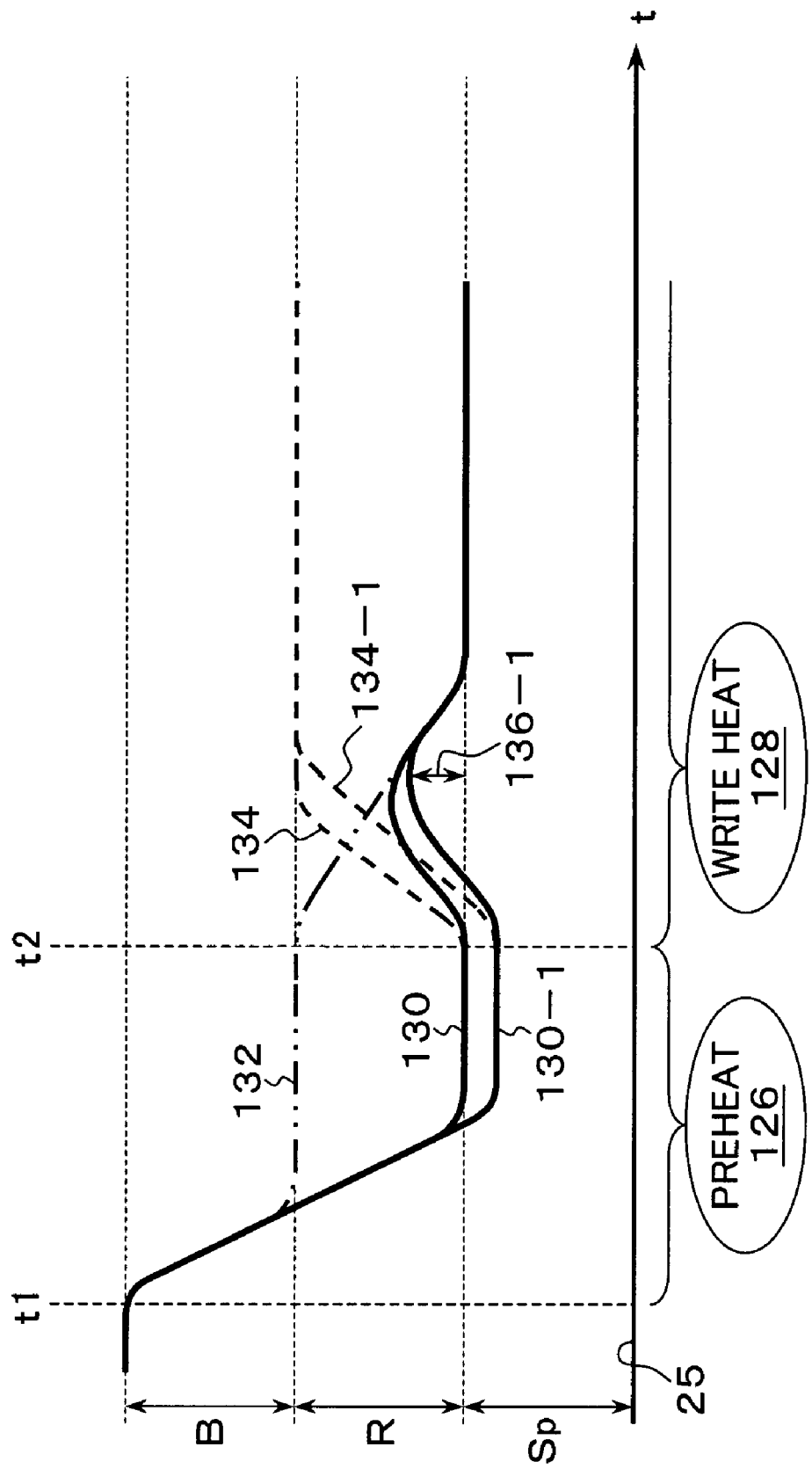

FIG. 14B CONTROL VALUE B

FIG. 14C CONTROL VALUE R

FIG. 14D WRITE GATE WG

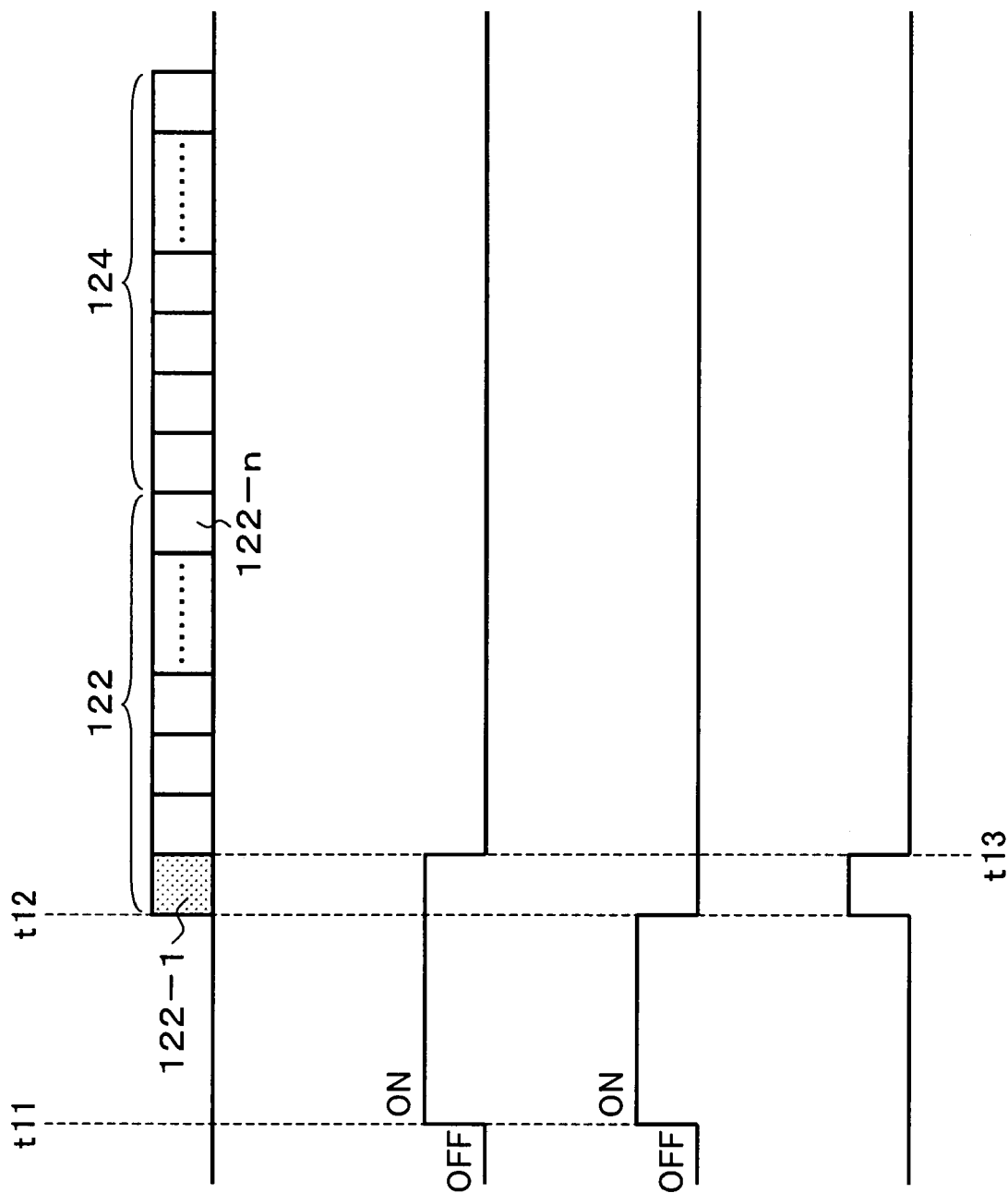

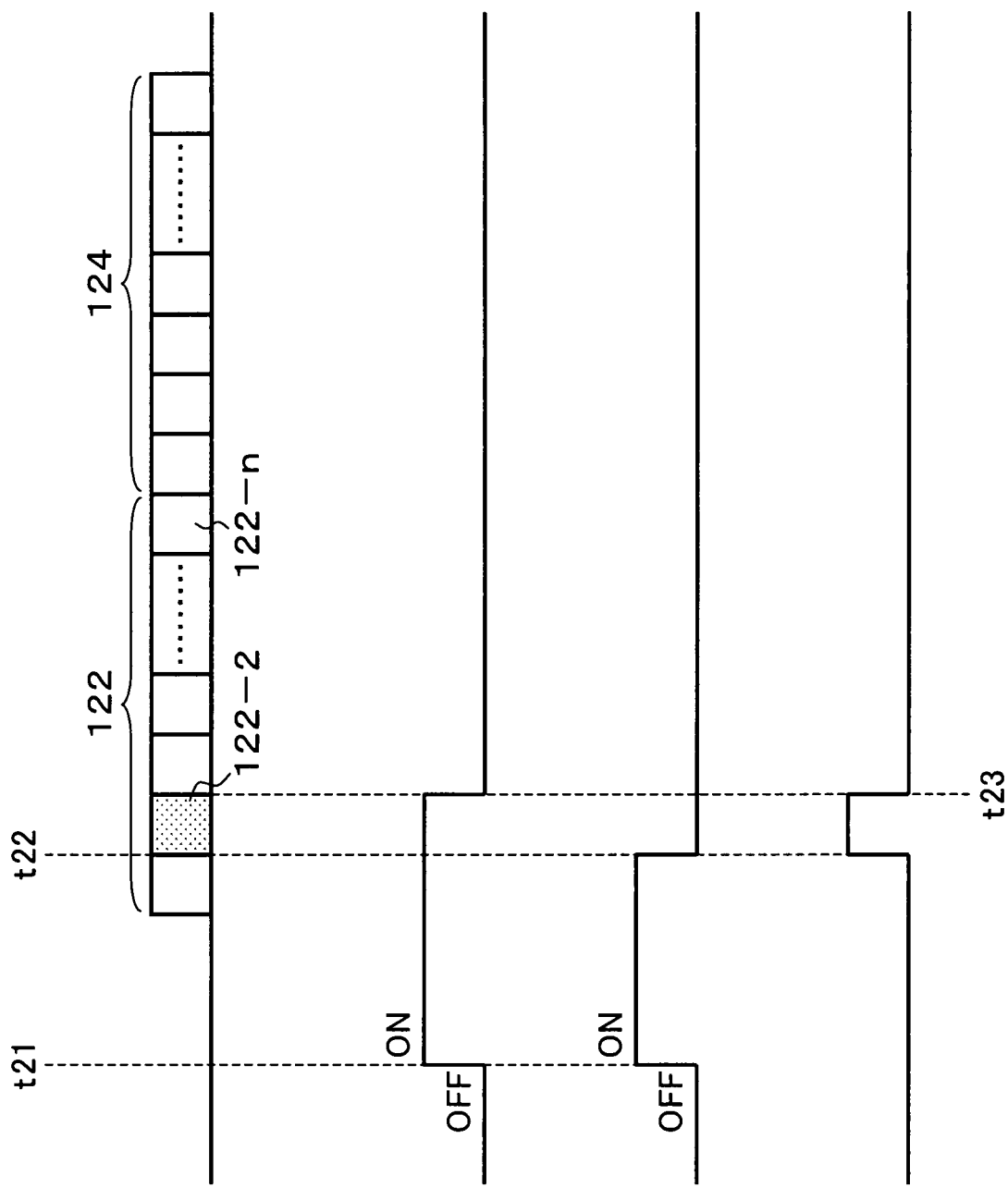

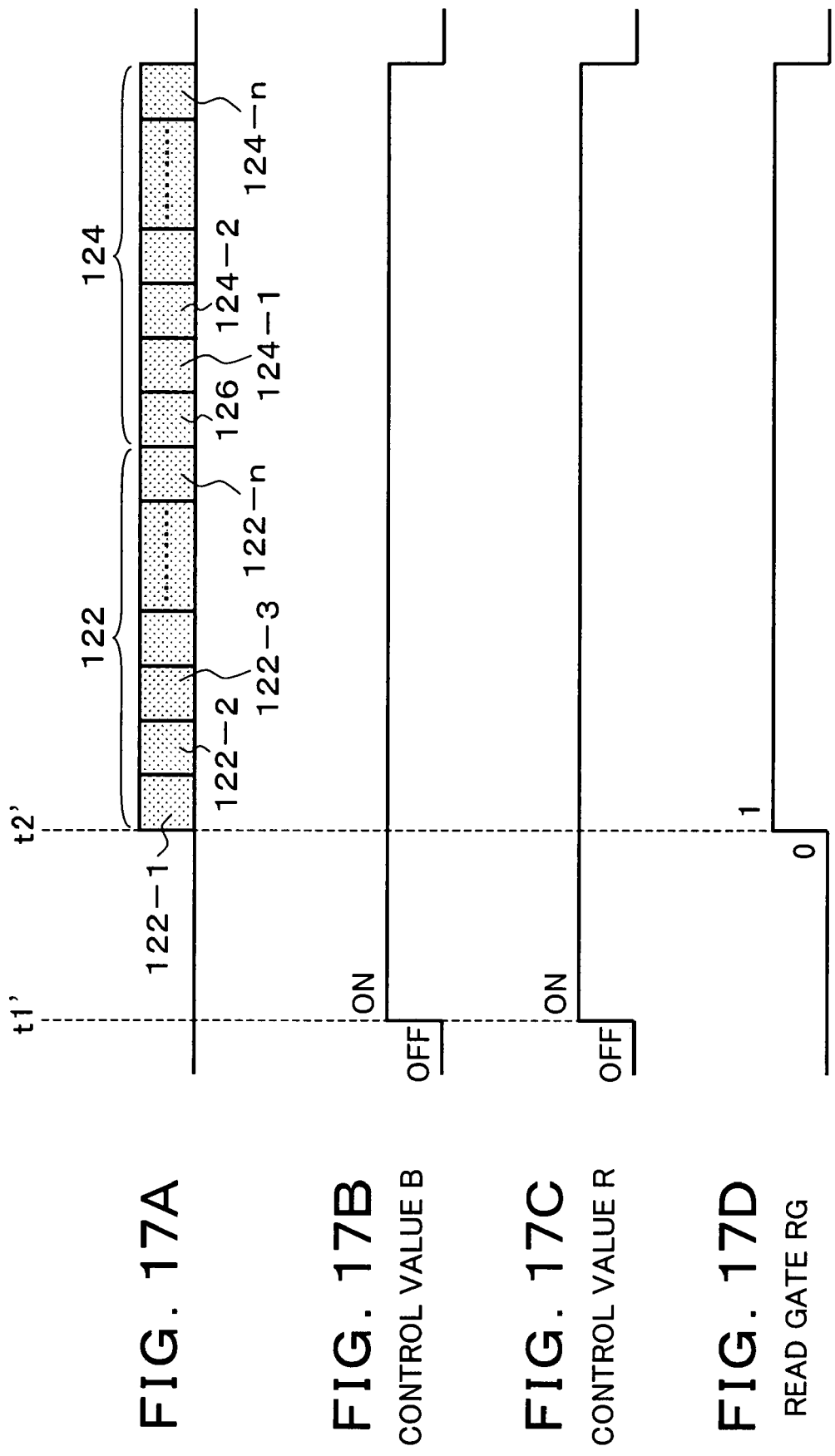

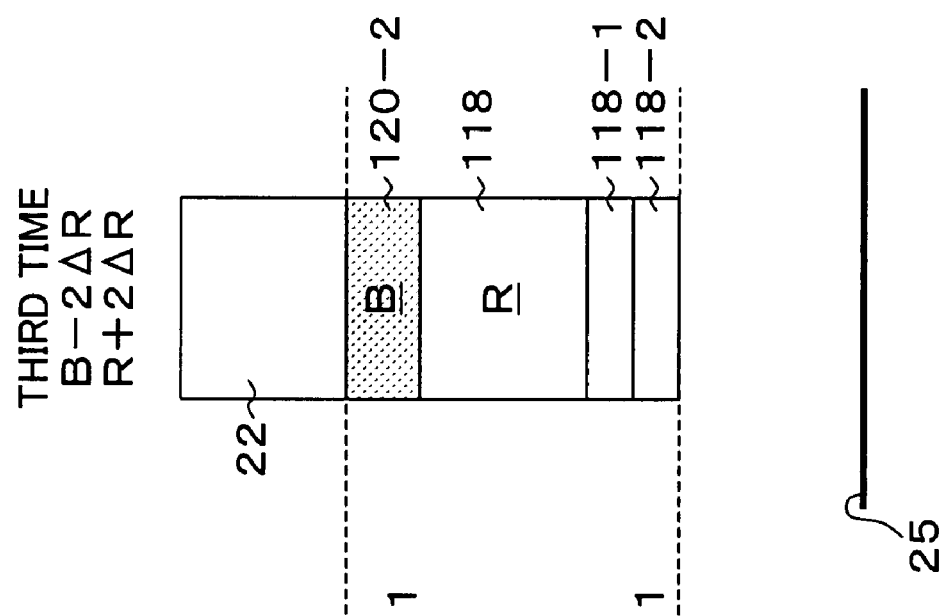

CONTROL DEVICE, CONTROL METHOD, AND STORAGE APPARATUS FOR CONTROLLING READ HEAD AND WRITE HEAD CLEARANCE

This application is a priority based on prior application No. JP 2006-29375, filed Oct. 31, 2006, in Japan.

BACKGROUND OF THE INVENTION

1. Field of the Invention

The present invention relates to a control device, a control method, and a storage apparatus which read and write data by causing a head to fly over a rotating recording medium and particularly relates to a storage apparatus, a control method, and a control circuit which control a clearance (spacing) between the head and the recording medium surface by thermal expansion caused by power distribution to and heating of a heater provided in the head.

2. Description of the Related Arts

Conventionally, the clearance between a head and a recording surface of a magnetic disk has to be reduced in order to realize a high recording density of a magnetic disk apparatus, and it is designed so that the clearance caused by rise of the head becomes constant by utilizing the pressure (positive pressure/negative pressure) of air that flows into the space between a slider, in which the magnetic head is disposed, and a magnetic recording medium. In order to improve the recording density, the distance between the head and the medium has to be reduced; therefore, the clearance of the head has been reduced year by year along with increase in the density of the recording density, and, recently, the clearance of 10 nm order has been realized. Since the conventional head maintains the clearance merely by the pressure of the air, change in the clearance due to the environmental temperature, mounting variation caused when the magnetic head is mounted, and variation in the clearance caused in each head like production variation caused in each head cannot be corrected. Therefore, the clearance has to be designed under the conditions, in which the variations are taken into consideration; however, since variation in the clearance of each head is present within a mechanical tolerance range, when medium contact is taken into consideration, there is a problem that the clearance cannot be set smaller than the tolerance range. Moreover, since the medium rotates at a high speed in the magnetic disk apparatus, when the clearance of the head is reduced, collision with minute protrusions on the magnetic disk surface readily occurs; and, when the medium and the magnetic head are brought into contact with each other, there is a problem that the life of the apparatus cannot be satisfied because of wear of the head, contamination (dust), etc. generated when the head and the medium are brought into contact with each other. Therefore, recently, like Patent JP2002-037480 (Japanese Republished Patent Publication), a method in which change in the protrusion value (TPR value) due to phenomenon in which the head flying surface protrudes toward the direction of the magnetic disk due to temperature increase of the write head (Thermal Protrusion: TPR) is measured and retained on the magnetic disk in an examination step or the like, and the clearance is controlled for each head by using the data has been proposed. Furthermore, methods like Patent JP2005-071546 and JP2005-276284 in which a heater is incorporated in the head, and the clearance between the head and the recording surface of the magnetic disk is controlled by utilizing the protrusion phenomenon which is caused by thermal expansion of the head flying surface along with power distribution of the heater have been proposed. In JP2005-071546 2, a constant element temperature is maintained by changing the electric power applied to an electrically conductive film provided in the head with respect to increase in the element temperature which is due to the apparatus temperature or recording/reproduction, so that a constant clearance is maintained between the element and the recording medium. In JP2005-276284, a clearance-increasing heating device which increases the distance between a recording/reproduction element and the magnetic disk surface by causing a part of an air bearing surface of the head to expand and protrude by heating and a clearance-reducing heating device which reduces the distance between the recording/reproduction element and the magnetic disk surface by causing another part of the air bearing surface of the head to expand and protrude by heating are provided in the head, and the clearance is corrected so that reproduction can be carried out without causing collision upon, for example, activation of the apparatus.

However, in such conventional methods that control the clearance between it and the magnetic disk recording surface by providing a heater in the head, basically, the protrusion value is adjusted so that reproduction can be carried out without causing medium contact by utilizing the fact that the clearance is changed by expansion/protrusion of the head flying surface along with power distribution to and heating of the heater; however, since a heater control value for a DA converter which sets the power supplied to the heater has been fixedly determined in a designing step, there has been a problem that highly precise clearance control that controls the clearance upon recording and reproduction to a constant target clearance in consideration of variation in the clearance that is different in each head cannot be performed. Moreover, there is a slight time lag after the clearance is changed by the protrusion caused by thermal expansion after power is distributed to the heater until it is stabilized; therefore, in the conventional clearance control by heater power distribution upon recording, it is in the state that the thermal expansion of the head is not completely saturated at a write starting part, and the clearance of the head does not reaches a target clearance; thus, there is a problem that the writing ability of the recording element is low, and the recording/reproduction characteristic is deteriorated at the write starting part. In order to solve these problems, when write is performed after preheating in which power distribution to the heater is started from a position before a target track is carried out, the thermal expansion of the head is completely saturated at the write starting position, it is stabilized at the target clearance, and the problem that the characteristic is deteriorated at the write starting part can be solved. However, even when the preheating is carried out, the head is thermally expanded when a recording current is caused to flow through the recording element upon recording; and, also in this case, there is a slight time lag until it is stabilized after the clearance is changed by protrusion which is caused by thermal expansion after flow of the recording current is started, and a phenomenon in which the clearance of the head is changed between the write starting sector and write sectors after that wherein the characteristic is changed occurs, which leads to inhibition of recording density improvement.

SUMMARY OF THE INVENTION

According to the present invention to provide a control device, a control method, and a storage apparatus which handle variation due to heads, radius positions, temperatures, etc. and sets, by a correction process, optimum heater control values which are adjusted so that characteristic deterioration due to thermal expansion by recording current immediately after recording start is improved.

(Control Device)

The present invention provides a control device of a storage apparatus having a head which has a reading element and a recording element, is provided with a heater which changes a protrusion value by thermal expansion involved in electric power distribution and heating, and accesses data by flying above a rotating recording medium.

As such control device, the present invention is characterized by having a parameter administration unit which registers and administers a base heater control value which sets electric power supplied to the heater upon preheating, recording, and reproduction and an adjustment heater control value which sets electric power supplied to the heater upon preheating and reproduction except for recording;

a write clearance control unit which, upon recording, performs preheating by electric power distribution to the heater by a control value, which is obtained by adding the base heater control value to the adjustment heater control value, from a sector position which is before by a predetermined set sector number and switches the electric power distribution to that by the base heater control value when the head reaches the target sector so as to perform write heating;

a read clearance control unit which, upon reproduction, performs preheating by electric power distribution to the heater by the control value, which is obtained by adding the base heater control value to the adjustment heater control value, from a sector position which is before by the predetermined set sector number and maintains the control value when the head reaches a target sector so as to perform read heating;

a heater control value measurement unit which, upon desired correction, measures a contact heater control value when the head is brought into contact (touchdown) with a medium surface while gradually increasing the adjustment heater control value from a predetermined initial value, sets the initial value to the adjustment heat control value, and sets the value, which is obtained by subtracting a minimum clearance heater control value corresponding to a predetermined minimum clearance and the initial value from the contact heater control value, as a base heater control value; and a write assist adjustment unit which adjusts the adjustment heater control value measured by the heater control value measurement unit to a heater control value which improves characteristic deterioration immediately after recording is started wherein preheating is switched to write heating.

Herein, the write assist adjustment unit has an area setting unit which sets a first measurement area and a second measurement area, which are divided into a plurality of blocks wherein one block comprises a plurality of sectors, in a measurement track used in write/read upon adjustment;

a first adjustment recoding unit which initially sets the base heater control value and the adjustment heater control value set by the heater control value measurement unit and records data in the first measurement area and the second measurement area by the write clearance control unit;

a second adjustment recording unit which initially sets the base heater control value and the adjustment heater control value set by the heater control value measurement unit and records data in each block of the first measurement area by the write clearance control unit;

a characteristic evaluation value detection unit which initially sets the base heater control value and the adjustment heater control value set by the heater control value measurement unit, reads the first measurement area and the second measurement area in block units by the read clearance control unit, and detects a mean value of characteristic evaluation values, which are obtained from read signals of blocks, for each of the first and second measurement areas; and a control value adjustment unit which compares the characteristic evaluation value of the first measurement area with the characteristic evaluation value of the second measurement area, repeats the processes by the first adjustment recording unit, the second adjustment recording unit, and the characteristic evaluation value detection unit while gradually increasing the adjustment heater control value until the difference between them is equal to or less than a predetermined value, and sets the adjustment heater control value when the difference between them is equal to or less than the predetermined value as an adjustment result.

The control value adjustment unit gradually increases the adjustment heater control value and, at the same time, gradually reduces the base heater control value by the same value so as to perform adjustment (base variable mode). Also, the control value adjustment unit may gradually increase the adjustment heater control value and fix the base heater control value to an initial value so as to perform adjustment (base fixed mode).

As the characteristic evaluation value, a Viterbi metric margin (VMM), a signal quality monitoring value (SQM), or an error rate is used. The heater control value measurement unit subjects the contact heater control value when the head is brought into contact with the medium surface to temperature correction to a heater control value at a reference temperature in accordance with a temperature difference between a temperature in the apparatus upon correction and the predetermined reference temperature (for example, 30° C.).

The parameter administration unit registers and administers the base heater control value and the adjustment heater control value separately for a head and a zone of a recording medium. The heater control value measurement unit and the write assist adjustment unit measure and adjust the base heater control value and the adjustment heater control value separately for heads and all the zones of the recording medium.

The heater control value measurement unit and the write assist adjustment unit measure and adjust the base heater control value and the adjustment heater control value for a head and a partial zone among a plurality of zones of a recording medium, and a heater control value obtained from an interpolation calculation from the heater control value of the measurement zone is set for the unmeasured zone.

The heater control value measurement unit and the write assist adjustment unit measure and adjust the base heater control value and adjustment heater control value with respect to a particular one track of a recording medium corresponding to the head and sets the measured and adjusted base heater control value and adjustment heater control value to all zones.

(Control Method)

The present invention provides a control method of a storage apparatus having a head which has a reading element and a recording element, is provided with a heater which changes a protrusion value by thermal expansion involved in electric power distribution and heating, and accesses data by flying above a rotating recording medium.

In such a control method of the present invention, a parameter administration step in which a base heater control value which sets electric power supplied to the heater upon preheating, recording, and reproduction and an adjustment heater control value which sets electric power supplied to the heater upon preheating and reproduction except for recording are registered and administered;

a write clearance control step in which, upon recording, preheating is performed by electric power distribution to the heater by a control value, which is obtained by adding the base heater control value to the adjustment heater control value, from a sector position which is before by a predetermined set sector number and the electric power distribution is switched to that by the base heater control value when the head reaches the target sector so as to perform write heating;

a read clearance control step in which, upon reproduction, preheating is performed by electric power distribution to the heater by the control value, which is obtained by adding the base heater control value to the adjustment heater control value, from a sector position which is before by the predetermined set sector number and the control value is maintained when the head reaches a target sector so as to perform read heating;

a heater control value measurement step in which, upon desired correction, a contact heater control value when the head is brought into contact with a medium surface is measured while gradually increasing the adjustment heater control value from a predetermined initial value, sets the initial value to the adjustment heat control value, and sets the value, which is obtained by subtracting a minimum clearance heater control value corresponding to a predetermined minimum clearance and the initial value from the contact heater control value, as a base heater control value; and a write assist adjustment step in which the adjustment heater control value measured by the heater control value measurement unit is adjusted to a heater control value which improves characteristic deterioration immediately after recording is started wherein preheating is switched to write heating.

(Storage Apparatus)

The present invention provides a storage apparatus having a head which has a reading element and a recording element, is provided with a heater which changes a protrusion value by thermal expansion involved in electric power distribution and heating, and accesses data by flying above a rotating recording medium.

As such storage apparatus, the present invention is characterized by having a parameter administration unit which registers and administers a base heater control value which sets electric power supplied to the heater upon preheating, recording, and reproduction and an adjustment heater control value which sets electric power supplied to the heater upon preheating and reproduction except for recording;

a write clearance control unit which, upon recording, performs preheating by electric power distribution to the heater by a control value, which is obtained by adding the base heater control value to the adjustment heater control value, from a sector position which is before by a predetermined set sector number and switches the electric power distribution to that by the base heater control value when the head reaches the target sector so as to perform write heating;

a read clearance control unit which, upon reproduction, performs preheating by electric power distribution to the heater by the control value, which is obtained by adding the base heater control value to the adjustment heater control value, from a sector position which is before by the predetermined set sector number and maintains the control value when the head reaches a target sector so as to perform read heating;

a heater control value measurement unit which, upon desired correction, measures a contact heater control value when the head is brought into contact with a medium surface while gradually increasing the adjustment heater control value from a predetermined initial value, sets the initial value to the adjustment heat control value, and sets the value, which is obtained by subtracting a minimum clearance heater control value corresponding to a predetermined minimum clearance and the initial value from the contact heater control value, as a base heater control value; and a write assist adjustment unit which adjusts the adjustment heater control value measured by the heater control value measurement unit to a heater control value which improves characteristic deterioration immediately after recording is started wherein preheating is switched to write heating.

According to the present invention, separately for a head and a zone which is a radius position of a recording medium, a contact heater control value which is required when a head is brought into contact with the recording medium surface by expansion and protrusion can be obtained by actual measurement while gradually increasing a heater control value, a base heater control value used in clearance control can be determined from the actually measured contact heater control value, and, when a default adjustment heater control value is adjusted to a heater control value, which improves characteristic deterioration immediately after recording is started wherein preheating is switched to write heating, by actual measurement, the heater control value required for always ensuring a specified minimum clearance (target clearance) corresponding to variation in the clearance depending on the head, zone, and temperature can be obtained. Therefore, the data recording density can be enhanced while ensuring the clearance margin of the head, and variation in the clearances of heads can be improved. The above and other objects, features, and advantages of the present invention will become more apparent from the following detailed description with reference to the drawings.

BRIEF DESCRIPTION OF THE DRAWINGS

FIG. 4 is an explanatory diagram of a parameter table used in the present embodiment;

FIGS. 8A to 8D are explanatory diagrams of touchdown measurement in the heater control value measurement process of the present embodiment;

FIGS. 9A to 9C are explanatory diagrams of a process of determining a base heater control value and an adjustment heater control value based on the touchdown measurement result of the present embodiment;

FIG. 13 is an explanatory diagram showing change of the head surface when the adjustment heater control value is increased by ΔR in FIGS. 11A to 11C;

FIGS. 14A to 14D are time charts of the write assist adjustment process of the present embodiment in which write to a first measurement area and a second measurement area is successively performed;

FIGS. 15A to 15D are time charts of the write assist adjustment process of the present embodiment in which write to a first block of the first measurement area is performed;

FIGS. 16A to 16D are time charts of the write assist adjustment process of the present embodiment in which write to a second block of the first measurement area is performed subsequent to FIGS. 15A to 15D;

FIGS. 17A to 17D are time charts of a read process in which data is read from the first measurement area and the second measurement area to measure VMM;

FIGS. 18A to 18C are explanatory diagrams of heater control in a base heater control value variable mode in the write assist adjustment process of the present embodiment;

FIGS. 19A and 18B are flow charts of the write assist adjustment process in step S2 of FIG. 7;

DETAILED DESCRIPTION OF THE PREFERRED EMBODIMENTS

Figure 1:
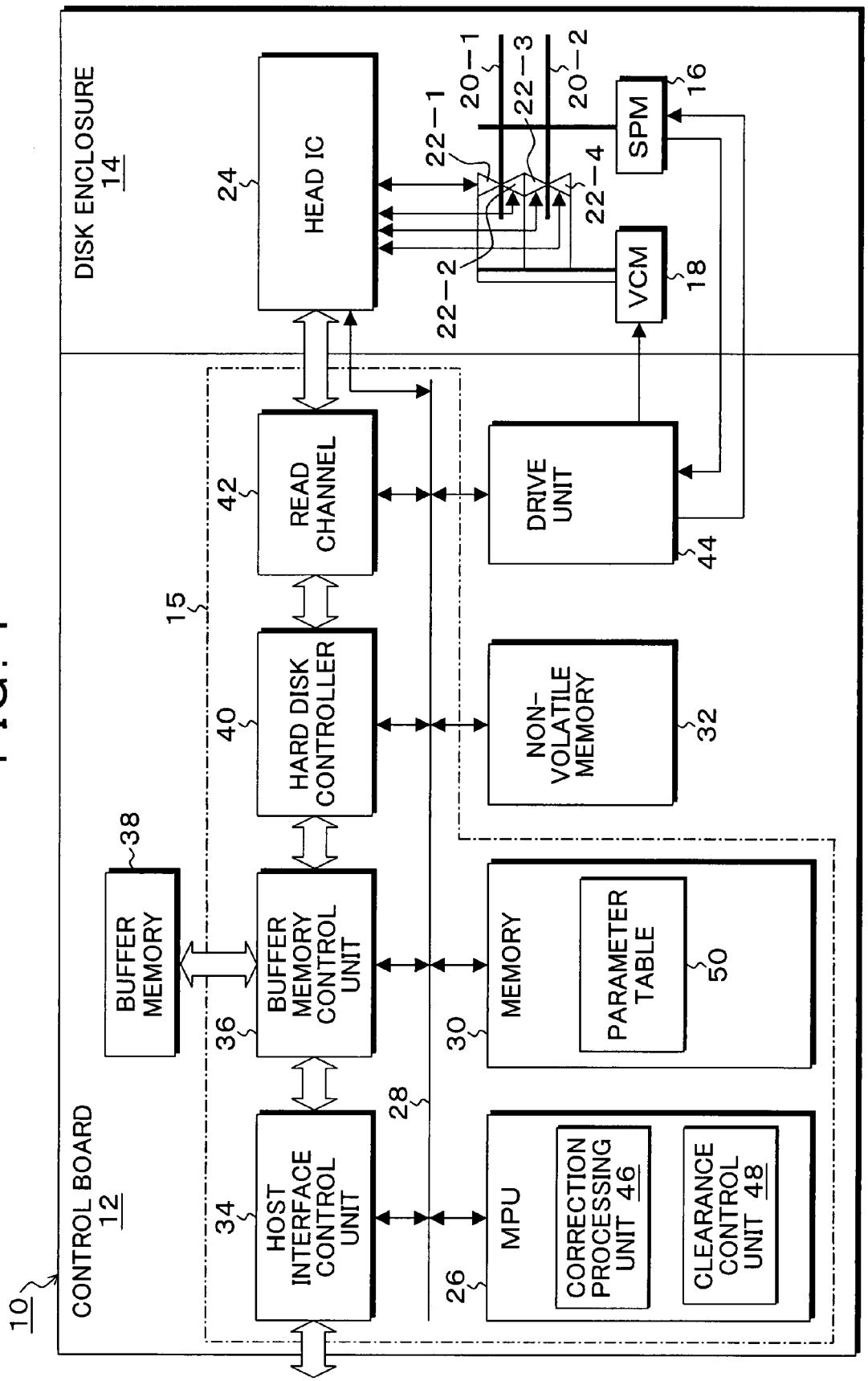
FIG. 1 is a block diagram of a magnetic disk apparatus showing an embodiment of a storage apparatus according to the present invention.

FIG. 1 is a block diagram showing an embodiment of a magnetic disk apparatus according to the present invention. In FIG. 1, the magnetic disk apparatus 10 which is known as a hard disk drive (HDD) is composed of a disk enclosure 14 and a control board 12. A spindle motor (SPM) 16 is provided in the disk enclosure 14; and magnetic disks (storage media) 20-1 and 20-2 are attached to a rotating shaft of the spindle motor 16 and rotated at, for example, 4200 rpm for a certain period of time. In addition, a voice coil motor (VCM) 18 is provided in the disk enclosure 14, wherein the voice coil motor 18 has distal ends of arms of head actuators on which heads 22-1 to 22-4 are loaded and performs positioning of the heads with respect to recording surfaces of the magnetic disks 20-1 and 20-2. In addition, recording elements and reading elements are loaded on the heads 22-1 to 22-4 in an integrated manner. The heads 22-1 to 22-4 are connected to a head IC 24 by signal lines, and the head IC 24 selects one of the heads according to a head select signal based on a write command or a read command from a host, which serves as an upper-level apparatus, so as to perform a write or a read. Moreover, in the head IC 24, a write amplifier is provided for a write system, and a pre-amplifier is provided for a read system. An MPU 26 is provided in the control board 12, and, with respect to a bus 28 of the MPU 26, a memory 30, which uses a RAM and stores a control program and control data, and a non-volatile memory 32, which uses an FROM or the like and stores a control program, are provided. In addition, with respect to the bus 28 of the MPU 26, a host interface control unit 34, a buffer memory control unit 36 which controls a buffer memory 38, a hard disk controller 40, a read channel 42 which functions as a write modulation unit and a read modulation unit, a drive unit 44 which controls the voice coil motor 18 and the spindle motor 16 are provided. Herein, the MPU 26, the memory 30, the host interface control unit 34, the buffer memory control unit 36, the hard disk controller 40, and the read channel 42 in the control board 12 can be composed as one control device 15; and, specifically, the control device 15 is composed as one LSI device. The magnetic disk apparatus 10 performs writing processes and reading processes based on commands from the host. Herein, normal operations in the magnetic disk apparatus will be described below. When a write command and write data from the host are received by the host interface control unit 34, the write command is decoded by the MPU 26, and the received write data is stored in the buffer memory 38 in accordance with needs. Then, it is converted into a predetermined data format by the hard disk controller 40, an ECC code is added thereto by ECC processing, and scrambling, RLL code conversion, and write compensation are performed in the write modulation system in the read channel 42. Then, it is written to a magnetic disk 20 from the write amplifier via the head IC 24 and from the recording element of, for example, the selected head 22-1. In this course, the MPU 26 gives a head positioning signal to the drive unit 44 having a VCM motor driver, etc.; and the voice coil motor 18 causes a head to seek a target track which is specified by the command and to be placed on the track so as to perform track following control. Meanwhile, when a read command from the host is received by the host interface control unit 34, the read command is decoded by the MPU 26, read signals read by the reading element of the head 22-1 which is selected by head selection of the head IC 24 are amplified by the pre-amplifier. Then, they are input to the read demodulation system of the read channel 42, read data is demodulated by partial response maximum likelihood detection (PRML) or the like, and errors are detected and corrected by performing ECC processing by the hard disk controller 40. Then, they are subjected to buffering to the buffer memory 38, and the read data is transferred to the host from the host interface control unit 34. As functions of the present embodiment realized in the MPU 26 by executing programs, a correction processing unit 46 and a clearance control unit 48 are provided. The heads 22-1 to 22-4 of the present embodiment have the reading elements and the recording elements and are provided with heaters which vary the protrusion value by thermal expansion involved in heating caused by electric power distribution. For example in an examination process in a plant, the correction processing unit 46 measures, for each head and each zone of the magnetic disks, heater control values which are required for controlling the clearance between respective reading elements and the recording surfaces of the magnetic disks 20-1 to 20-2 for each of the heads 22-1 to 22-4, registers that in a parameter table 50, and records that to system areas of the magnetic disks 20-1, 20-2 or the non-volatile memory 32 of the apparatus. The heater control values used in the present embodiment include two values, a base heater control value B and an adjustment heater control value R, and the two heater control values B and R are measured for each head and each zone of the magnetic disks and registered in the parameter table 50 in a correction process. The clearance control unit 48 varies the electric power distributed to the heater provided in the head to vary the protrusion value of the head, thereby controlling the clearance to a predetermined minimum clearance (target clearance) upon reproduction and recording.

Figure 2A:
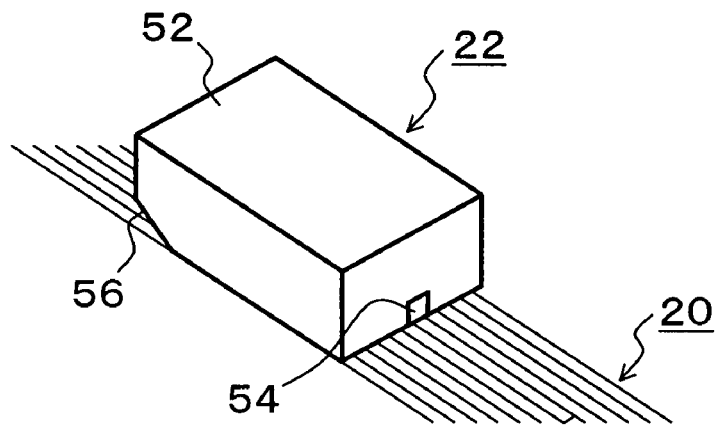
FIGS. 2A and 2B are explanatory drawings of a head structure of the present embodiment.
Figure 2B:
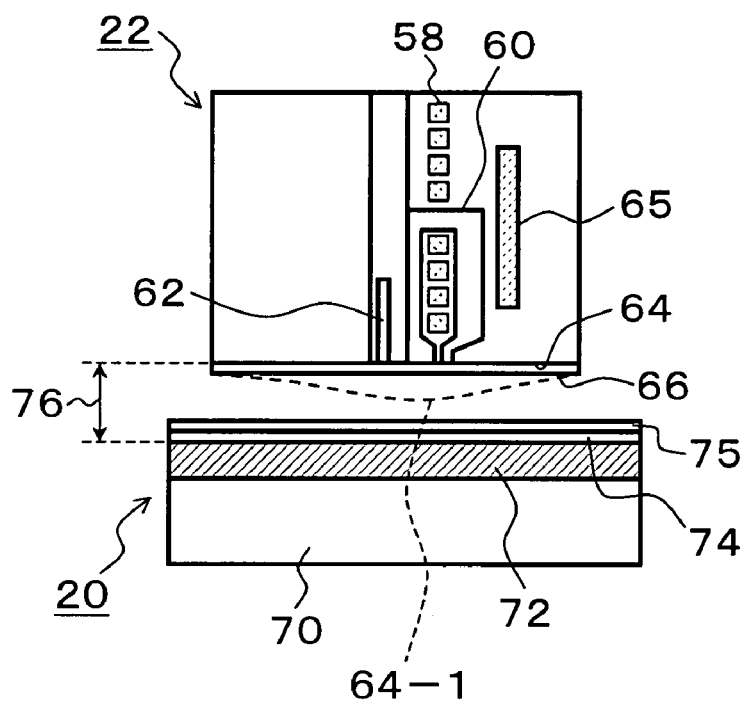

FIGS. 2A and 2B are explanatory drawings of a head structure of the present embodiment. FIG. 2A focuses on a head 22 which is used in the present embodiment, wherein a reading element and a recording element are formed on an end face of a slider 52 which is made of, for example, a ceramic material. A tapered surface 56 is formed in the distal end side of the flying surface of the slider 52 which is opposed to the magnetic disk 20, and an air communication groove 54 is formed on the flying surface in the track direction.

FIG. 2B is a cross sectional view wherein the head 22 is viewed from the track direction. A recording coil 58 and a recording core 60 are provided as the recording element in the head 22 which is made of ceramic or the like. A reading element 62 is provided in the left side of the recording element such that it is adjacent thereto. As the reading element 62, a GMR element (Giant Magneto Resistance element) or a TMR element (Tunneling Magneto Resistance element) is used. The surface of the head 22 opposed to the magnetic disk 20 is an ABS surface (Air Bearing Surface) 64, and a protective film 66 is formed on the surface thereof. On the other hand, in the magnetic disk 20, a recording film 72 is formed on a substrate 70, a protective film 74 is formed subsequent to the recording film 72, and a lubricant 75 is further provided on the surface. In the present embodiment, a heater 65 is provided such that it is close to the recording core 60 which constitutes the recording element of the head 22. When electric power is distributed to the heater 65 so as to carry out heating, the ABS surface 64 serving as the flying surface of the head 22 expands and protrudes toward the magnetic disk 20 side as shown by a broken-line head surface 64-1. A clearance 76 between the head 22 and the magnetic disk 20 is defined as a distance from the lower end of the reading element 62 to the recording film 72 of the magnetic disk 20.

Figure 3:
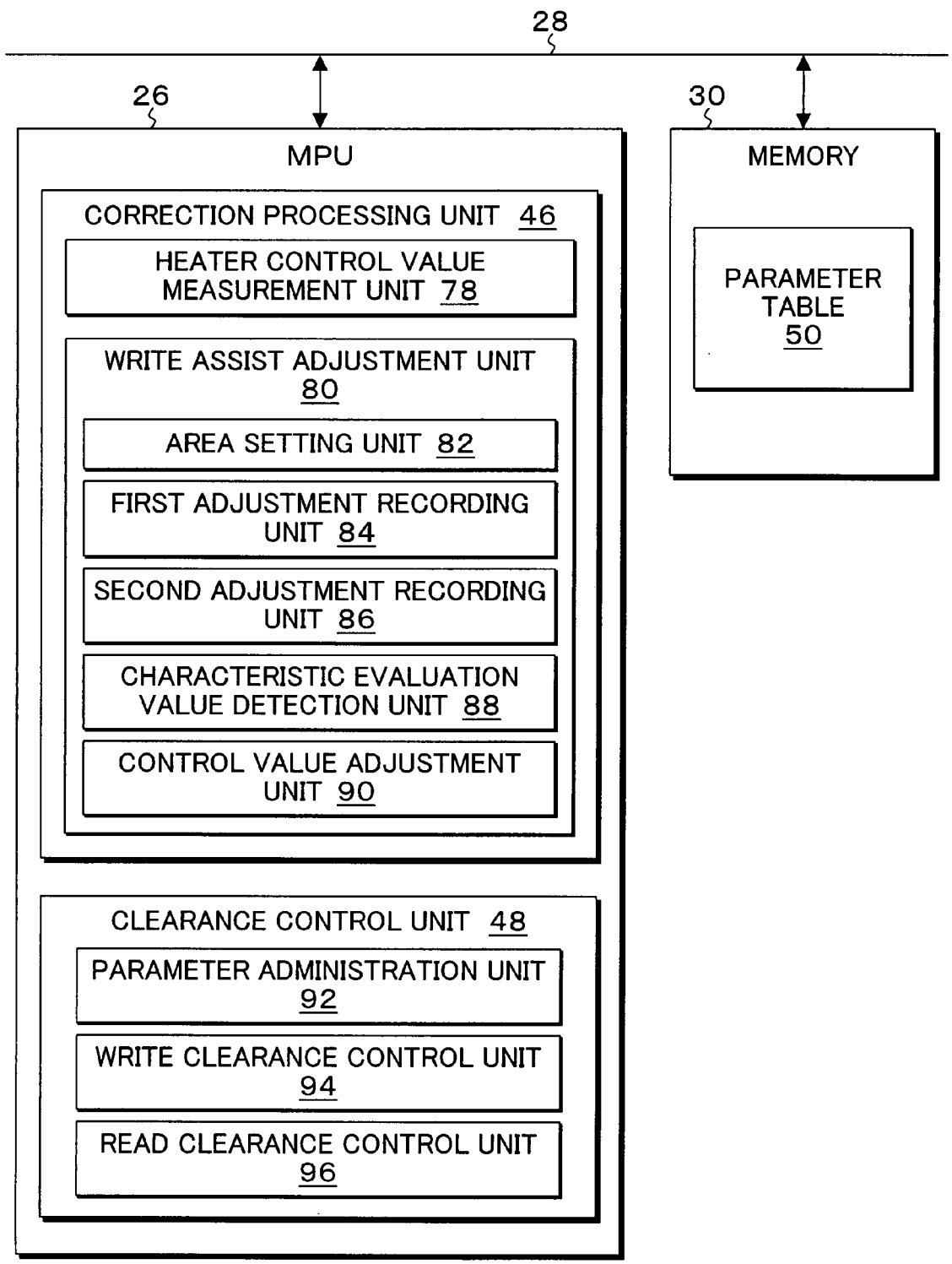
FIG. 3 is a block diagram showing details of a functional configuration of a MPU in the present embodiment.

FIG. 3 is a block diagram showing details of a functional configuration of the MPU 26 in the present embodiment. In FIG. 3, as functions of the MPU 26 realized by execution of a firmware program, the clearance control unit 48 and the correction processing unit 46 are provided. In the clearance control unit 48, a parameter administration unit 92, a write clearance control unit 94, and a read clearance control unit 96 are provided. The parameter administration unit 92 administers registration and reading of the heater control values with respect to the parameter table 50 which is read and located in the memory 30. In the parameter table 50, as shown in FIG. 4, the base heater control values B and the adjustment heater control values R are registered separately for heads and zones. The base heater control value B and the adjustment heater control value R registered in the parameter table 50 are control values which are measured in the correction process in the correction processing unit 48 of FIG. 3. Herein, the base heater control value B and the adjustment heater control value R used in heater control in the present embodiment will be described.

Figure 5:
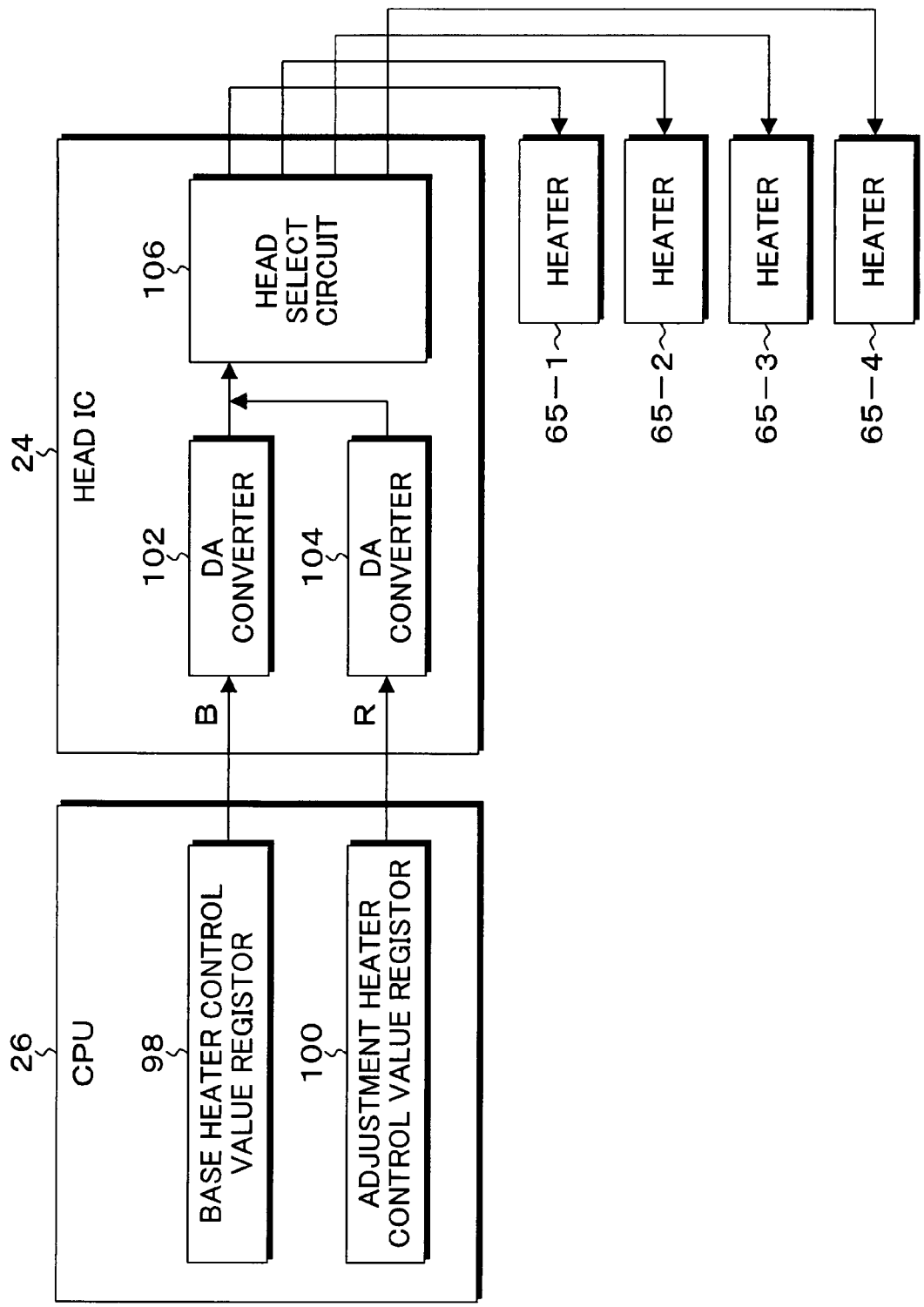
FIG. 5 is a block diagram of a heater control system in the present embodiment.

FIG. 5 is a block diagram of a heater control system in the present embodiment. In FIG. 5, in the MPU 26, a main heater control value resistor 98 and an adjustment heater control value resistor 100 are provided. Upon recording or reproduction, when a head and a zone is specified in the parameter table 50 shown in FIG. 4, the corresponding base heater control value B and adjustment heater control value R are read and set in the base heater control value resistor 98 and the adjustment heater control value resistor 100, respectively. DA converters 102 and 104 are provided in the head IC 24 side; wherein, after they respectively convert the heater control values B and R, which are set in the base heater control value resistor 98 and the adjustment heater control value resistor 100, into analog signals and add them, electric power is supplied via a head select circuit 106 to any of heaters 65-1 to 65-4 corresponding to the head which is selected at that point, the head is caused to protrude by heating and expansion, and the clearance which is a distance from the head surface to the medium surface is controlled to a minimum clearance (target clearance) do which is set in advance.

Figure 6:
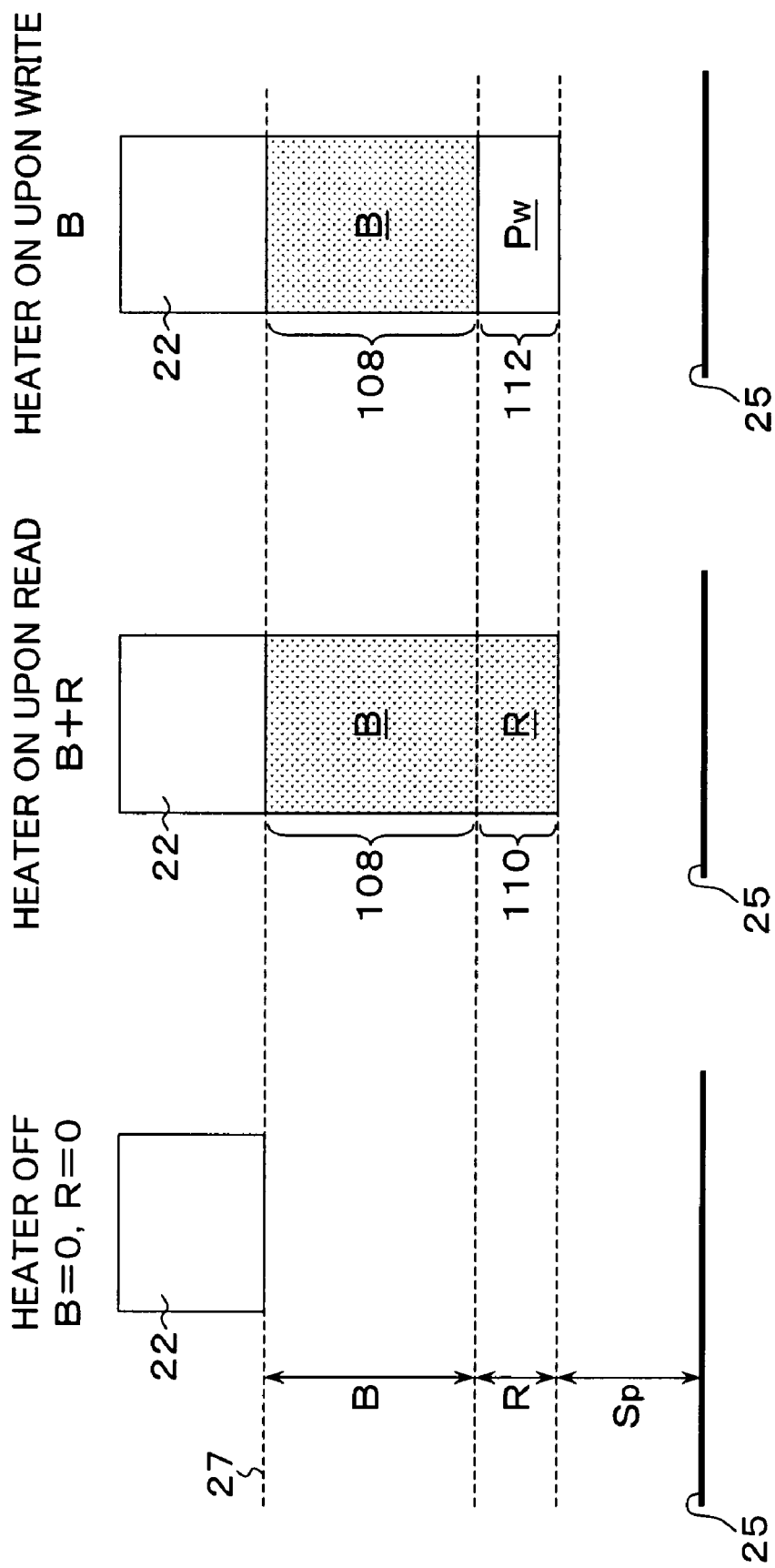
FIGS. 6A to 6C are explanatory diagrams of heater control upon reproduction and record using a base heater control value and an adjustment heater control value in the present embodiment.

FIGS. 6A to 6C are explanatory diagrams of heater control upon reproduction and recording using the base heater control value B and the adjustment heater control value R in the present embodiment. FIG. 6A is in the state in which heater power distribution is turned off, wherein B=0 and R=0 at that point, and the head surface of the head 22 is not protruded by thermal expansion.

FIG. 6B shows change of the head surface upon reproduction, wherein, upon reproduction, electric power is distributed to the heater by a heater control value (B+R), which is produced by adding the base heater control value B to the adjustment heater control value R, so as to heat and expand the head 22; thus, a head surface changed value 108 by the base heater control value B and a head surface changed value 110 by the adjustment heater control value R are generated, and a space corresponding to a minimum space control value Sp which is a converted value of the heater control value corresponding to a minimum space $d_0$ is ensured in the space to the medium surface 25.

FIG. 6C shows change of the head surface according to the heater control value upon recording; wherein, upon recording, the adjustment heater control value R is turned off, electric power is distributed to the heater merely by the base heater control value B, and a head surface changed value 108 corresponding to the base heater control value B is generated. Furthermore, upon recording, there is heat generation which is caused by a recording current which flows through the recording coil 58 of the head 22 shown in FIG. 2B, and a head surface changed value 112 corresponding to thermal expansion caused by write power Pw is added. Therefore, upon recording, the minimum space $d_0$ is ensured with respect to the medium surface 25 by a head surface changed value which is produced by adding the head surface changed value 112 according to the write current to the head surface changed value 108 according to the base heater control value B. Furthermore, in both the reproduction of FIG. 6B and the recording of FIG. 6C, preheating is performed from a position before a target sector by a predetermined number of set sectors since there is delay until the protrusion value caused by thermal expansion is stabilized after electric power is distributed to the head 22. The heater control value upon preheating is the heater control value (B+R) produced by adding the base heater control value B to the adjustment heater control value R both in the reproduction and recording. By virtue of the preheating corresponding to the predetermined set sector number, when it reaches a target sector upon reproduction, the heater control value of the preheating is maintained without change to start a reproduction process since the heater control value upon reproduction is same as the added heater control value (B+R) as shown in FIG. 6B. Meanwhile, upon recording of FIG. 6C, since it is merely the base heater control value B, when it reaches a target sector, the heater control value (B+R) in the preheating is switched to the target heater control value B to perform a recording process. Such reproduction process accompanied by the heater control of FIG. 6B and recording process accompanied by the heater control of FIG. 6C are executed respectively by the write clearance control unit 94 and the read clearance control unit 96 provided in the clearance control unit 48 of FIG. 3. In the write clearance control and the read clearance control, the parameter table 50 of FIG. 4 is referenced according to a head and a zone corresponding to a target track by decoding a write command and a read command received from an upper-level apparatus, a base heater control value B and an adjustment heater control value R corresponding to the head and the zone are acquired, and the heater control upon reproduction and the heater control upon recording shown in FIG. 6B or 6C are executed.

Referring again to FIG. 3, the correction processing unit 46 provided in the MPU 26 is a function realized by executing firmware for the correction process, which is installed in the MPU 26, for example, in an examination step in an apparatus production stage, by the MPU 26, and a heater control value measurement unit 78 and a write assist adjustment unit 80 are provided in the correction processing unit 46. Upon organization such as an examination process upon production, the heater control value measurement unit 78 detects touchdown, in which the head contacts a medium surface, while gradually increasing the adjustment heater control value R by a certain value ΔR at each time from a predetermined initial value $R_0$, measures a contact heater control value Rtd when touchdown is detected, sets an initial value R0 as the adjustment heater control value R, and sets a value, which is obtained by subtracting the minimum clearance heater control value Sp corresponding to a predetermined minimum clearance $d_0$ and the initial value $R_0$ from the contact heater control value Rtd, as the base heater control value R. In other words, the adjustment heater control value R and the base heater control value B are determined so that $R=R_0$ and $B=Rtd-Sp-R_0$.

The write assist adjustment unit 80 executes an adjustment process in which the adjustment heater control value R determined by the measurement process of the heater control value measurement unit 78 is used as a heater value which improves characteristic deterioration in top sectors immediately after recording is started wherein preheating is switched to write heating upon write access. For the adjustment process by the write assist adjustment unit 80, the functions of an area setting unit 82, a first adjustment recording unit 84, a second adjustment recording unit 86, a characteristic evaluation value detection unit 88, and a control value adjustment unit 90 are provided. The area setting unit 82 sets a first measurement area and a second measurement area which are divided into a plurality of blocks, wherein one block comprises a plurality of sectors, for measurement tracks which are used in write and read upon write assist adjustment. The first adjustment recording unit 84 initially sets the base heater control value B and the adjustment heater control value R set by the heater control value measurement unit 78 and successively records data in the first measurement area and the second measurement area by the write clearance control unit 94. The second adjustment recording unit 86 initially sets the base heater control value B and the adjustment heater control value R measured by the heater control value measurement unit and records data in each block of the first measurement area by the write clearance control unit 94. The characteristic evaluation value detection unit 88 initially sets the base heater control value and the adjustment heater control value set by the heater control value measurement unit 78, reads the first measurement area and the second measurement area in block units by the read clearance control unit 96, and detects, respectively for the first measurement area and the second measurement area, mean values of performance evaluation values obtained from read signals of the blocks. In the present embodiment, VMM (Vitabi Metric Margin) is used as the performance evaluation value. In VMM, Viterbi decoding which is a kind of maximum likelihood decoding is performed as a decoding method of the read channel 42 of FIG. 1, squared error values of a finally selected path and a path subsequent to that are compared when Viterbi decoding is performed, and it is obtained from the read channel 42 as a value which is obtained by counting the number thereof when there is no margin. Also, a signal quality evaluation value QM which is obtained from the read channel 42 may be similarly used as the performance evaluation value; furthermore, an error rate may be also used although there is a problem that processing takes time. The control value adjustment unit 90 compares the characteristic evaluation value of the first measurement area with the characteristic evaluation value of the second measurement area measured by the characteristic evaluation value detection unit 88 and repeats the processes by the first adjustment recording unit 84, the second adjustment recording unit 86, and the characteristic evaluation value detection unit 88 while gradually increasing the adjustment heater control value R by the certain value ΔR at each time until the difference between the characteristic evaluation value of the second measurement area and the characteristic evaluation value of the first measurement becomes a predetermined value or less. When the difference between the characteristic evaluation value of the second measurement area and the characteristic evaluation value of the first measurement area becomes the predetermined value or less, the adjustment heater control value at the point is acquired as an adjustment result and set in the parameter table 50 of FIG. 4.

Figure 7:
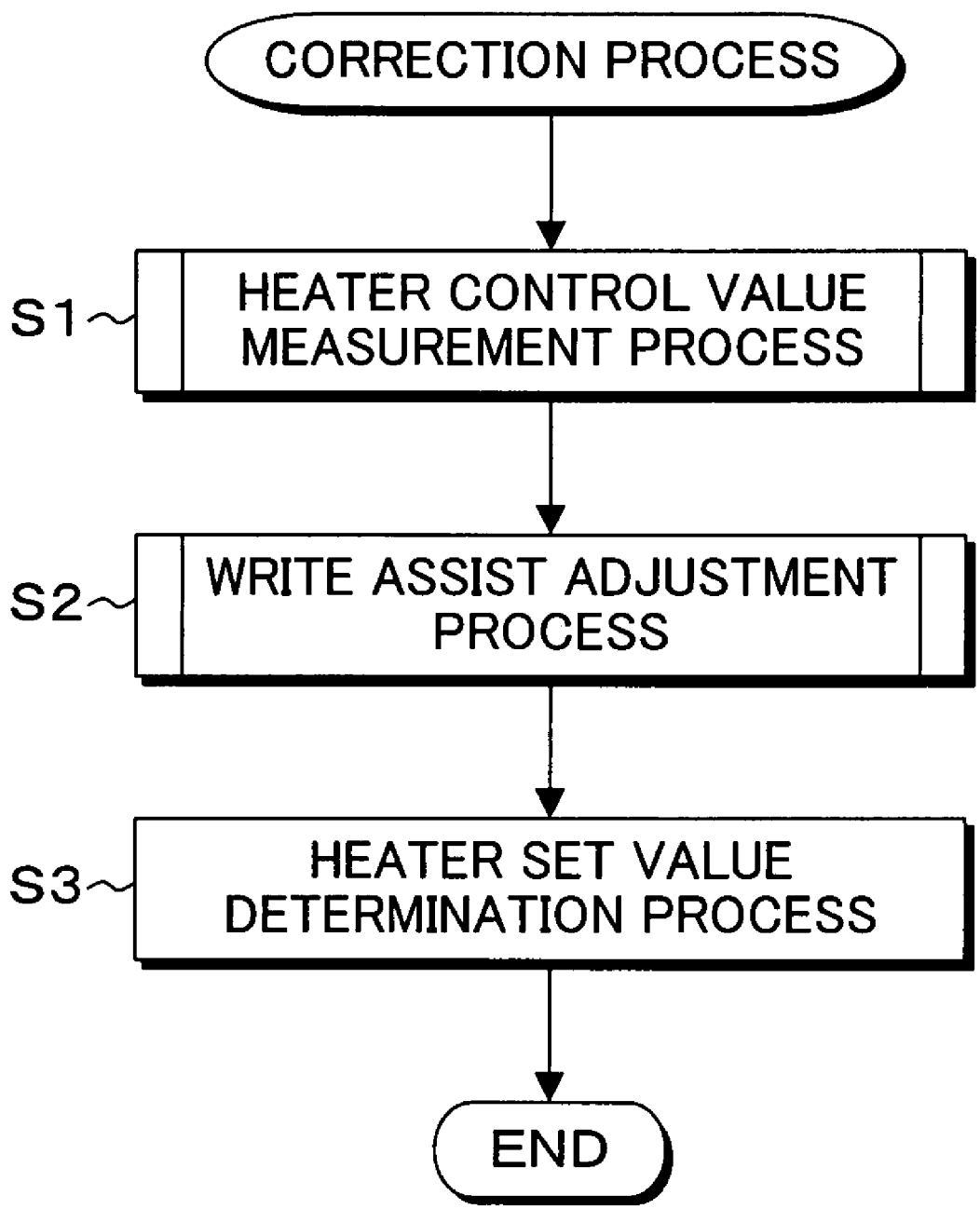
FIG. 7 is a flow chart showing a correction process in the present embodiment.

FIG. 7 is a flow chart showing the correction process by the correction processing unit 46 of FIG. 3. In FIG. 7, the correction process is executed in, for example, an examination process in a production stage; and, in step S1, a measurement process of the base heater control value B and the adjustment heater control value R based on touchdown detection of the head is executed. Subsequently, in step S2, a write assist adjustment process in which the adjustment heater control value R obtained in the measurement process is adjusted to an optimum value is executed. Then, in step S3, a determination process in which the base heater control value B and the adjustment heater control value R are set in the parameter table 50 is performed. The parameter table 50 is further stored in the non-volatile memory 32 or a system area of the magnetic disk.

FIGS. 8A to 8D are explanatory diagrams of the touchdown measurement by the heater control value measurement unit 78 provided in the correction processing unit 48 of FIG. 3. In the touchdown measurement in FIGS. 8A to 8D, in the correction process, in the state in which the heater is caused to seek a predetermined measurement track and placed on the track, touchdown wherein the head is brought into contact with the medium surface is measured while gradually increasing the adjustment heater control value R by the predetermined value ΔR at each time.

FIG. 8A shows the state before measurement is started wherein electric power is not distributed to the heater of the head 22, the head 22 has a clearance d with respect to the medium surface 25, the clearance d exists so as to have various variations depending on the position of the head medium in the radius direction, and the clearance d is an unknown value.

In this state, as shown in FIG. 8B, in the first place, with respect to the heater of the head 22, electric power is distributed to the heater by the initial value $R_0$ of the adjustment heater control value which is set in advance as default, thereby generating the head surface changed value 108. The initial value $R_0$ set as default of the adjustment heater control value R is a value which is determined in a designing stage as a head surface changed value dependent on thermal expansion that is caused by the write power Pw when a write current based on normal user data is caused to flow through the head 22.

As shown in FIG. 8B, when the head surface changed value 108 is obtained by heating by the heater power distribution based on the initial value $R_0$, in this state, a touchdown detection process in which presence of touchdown with the medium surface 25 is detected is executed. Herein, the methods that measure the clearance (spacing value) of the head for detecting touchdown of the head 22 include the following three methods.

(1) Higher harmonic wave ratio measurement method (2) Wallace spacing loss measurement method (3) Error generation rate measurement method First of all, in the higher harmonic wave measurement method of (1), test data of a single frequency is written to a measurement track in the state in which heater power distribution is turned off, an amplitude $V_0$ (f) of a basic frequency and an amplitude $V_0$ (3f) of a third harmonic wave are acquired from a mean amplitude of the read signal thereof, and an initial amplitude ratio $RA_0$ is calculated by the following expression.

$$RAo = \log\frac{Vo(f)}{Vo(3f)}$$

Next, the adjustment heater control value R is increased by the predetermined value $\Delta R$ to read the measurement track, an amplitude Vi (f) of a basic frequency f and an amplitude Vi (3f) of a third harmonic wave 3f are measured from the mean amplitude of the read signal, and an amplitude ratio RAi is calculated by the next expression.

$$RAi = \log\frac{Vi(f)}{Vi(3f)}$$

Next, based on the initial amplitude ratio $RA_0$ and the measurement amplitude ratio RAi which is measured when the heater control value is increased by $\Delta R$, a clearance changed value $\Delta d$ is calculated by the next expression.

$$\Delta d = \frac{v(RAi - RAo)}{2\pi(3f - f)}$$

In this manner, the clearance changed value $\Delta d$ is calculated while sequentially increasing the adjustment heater control value R by the certain value $\Delta R$ at each time, and a non-continuous point at which the clearance changed value $\Delta d$ is not changed but becomes constant is determined to detect touchdown of the head. Next, in the Wallace spacing loss measurement method of (2), the clearance changed value $\Delta d$ is detected based on the spacing loss method according to Wallace. The clearance changed value $\Delta d$ can be provided by the next expression when the initial amplitude of the read signal before electric power distribution to the heater is $V_0$, and the mean amplitude obtained by heater electric power distribution based on the adjustment heater control value is Vi.

$$\Delta d = \frac{\lambda}{2\pi}\log\left(\frac{Vi}{Vo}\right)$$

A non-continuous point at which the calculated clearance changed value $\Delta d$ by the method described above becomes constant is determined to detect touchdown. Furthermore, in the error generation rate measurement method of (3), an error generation rate is detected from the read signal of the measurement track while increasing the adjustment heater control value by the certain value $\Delta R$ at each time, and touchdown of the head is detected from a non-continuous point wherein variation of the error generation rate becomes constant. Note that touchdown detection in the present embodiment is not limited to above described (1) to (3), and arbitrary detection methods which detect touchdown while increasing the amount of electric power distribution to the heater can be used.

FIG. 8C shows the case in which touchdown is not detected with the heater electric power distribution by the initial value $R_0$ of the adjustment heater control value R, and a head surface changed value 110-1 is generate by further increasing the heater control value by the certain value $\Delta R$. When such gradual increase of the heater control value $\Delta R$ is repeated, as shown in FIG. 8D, head surface changed values 110-1 to 110-n are generated, and contact with the medium surface 25 when the head surface changed value is 110-n is detected as touchdown from determination of the non-continuous point according to the measurement of any one of above described (1) to (3). Then, the adjustment heater control value when touchdown is detected is detected as the touchdown control value Rtd. The touchdown heater control value Rtd can be provided by $$Rtd = R_0 + \Delta R \times n.$$

FIGS. 9A to 9C are explanatory diagrams of a process of determining the base heater control value B and the adjustment heater control value R based on the touchdown measurement result of FIGS. 8A to 8D. FIG. 9A shows the head surface changed value 112 upon touchdown detection of FIG. 8D, wherein the head surface changed value 112 is generated by electric power distribution to the heater according to the touchdown heater control value Rtd. In the present embodiment, since control is performed so that the clearance of the head surface with respect to the medium surface 25 by heater electric power distribution becomes the minimum clearance $d_0$ which is set in advance, the heater control value, i.e., the minimum clearance heater control value Sp that realizes the minimum clearance $d_0$ is calculated in advance, and the minimum space control value Sp, which provides the minimum space $d_0$, is subtracted from the touchdown heater control value Rtd, which is detected in the touchdown measurement, thereby calculating a heater control value Rsp shown in FIG. 6B which corresponds to the added heater control value (B+R) used in reproduction. More specifically, it is provided by Rsp=Rtd−Sp. Since the calculated heater control value Rsp is an added value of the base heater control value B and the adjustment heater control value R, as shown in FIG. 9C, the adjustment heater control value R at this point is set as the initial value $R_0$, which is provided as default, in other words, $$R = R^0; \text{ and,}$$

when the thus determined adjustment heater control value R is subtracted from the heater control value Rsp, the base heater control value B is calculated. In other words, the base heater control value B is determined as $$B = Rsp - R_0 = Rtd - Sp - R_0.$$

Figure 10A:
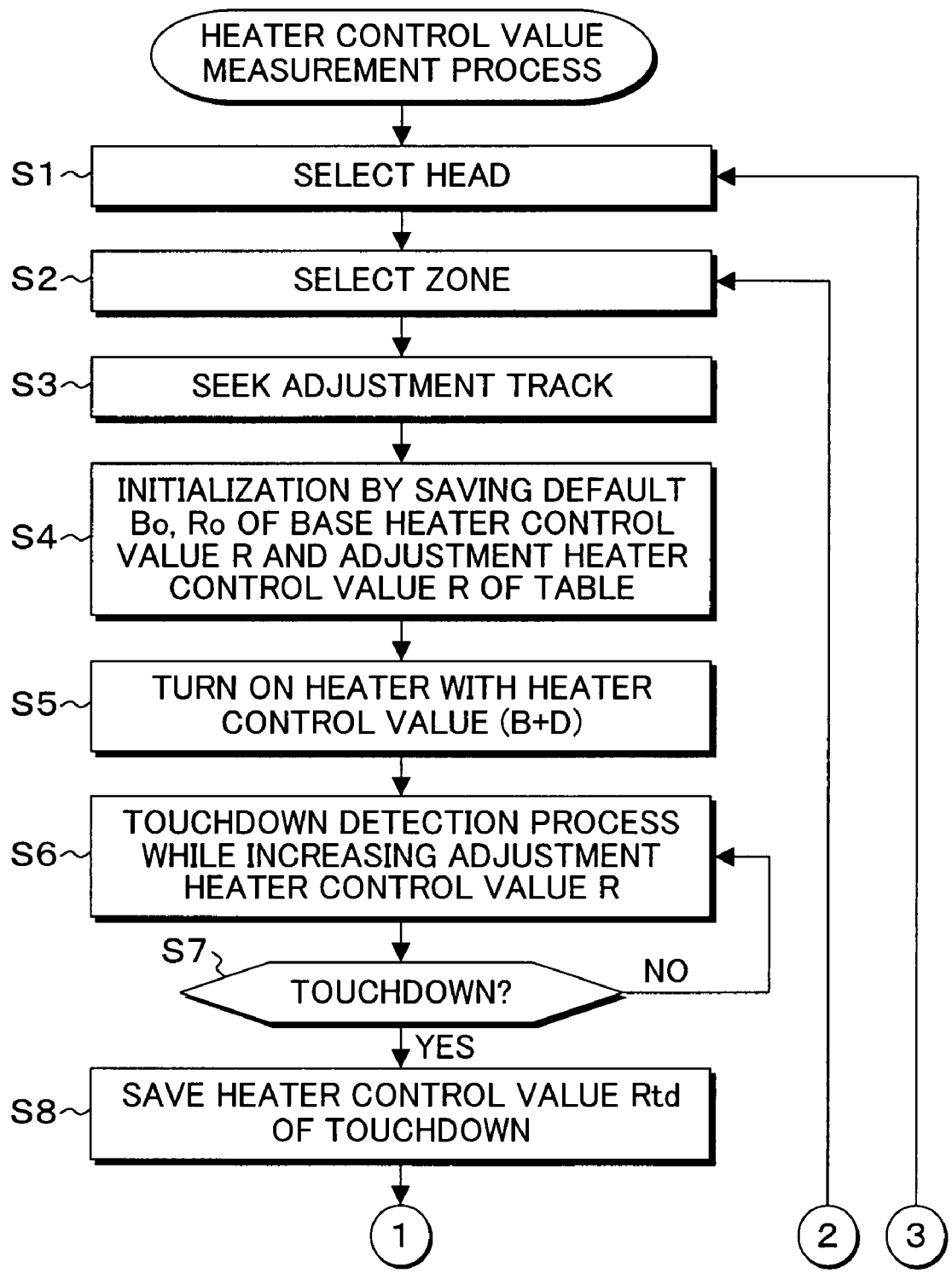
FIGS. 10A and 10B are flow charts showing details of the heater control value measurement process according to step S1 of FIG. 7.
Figure 10B:
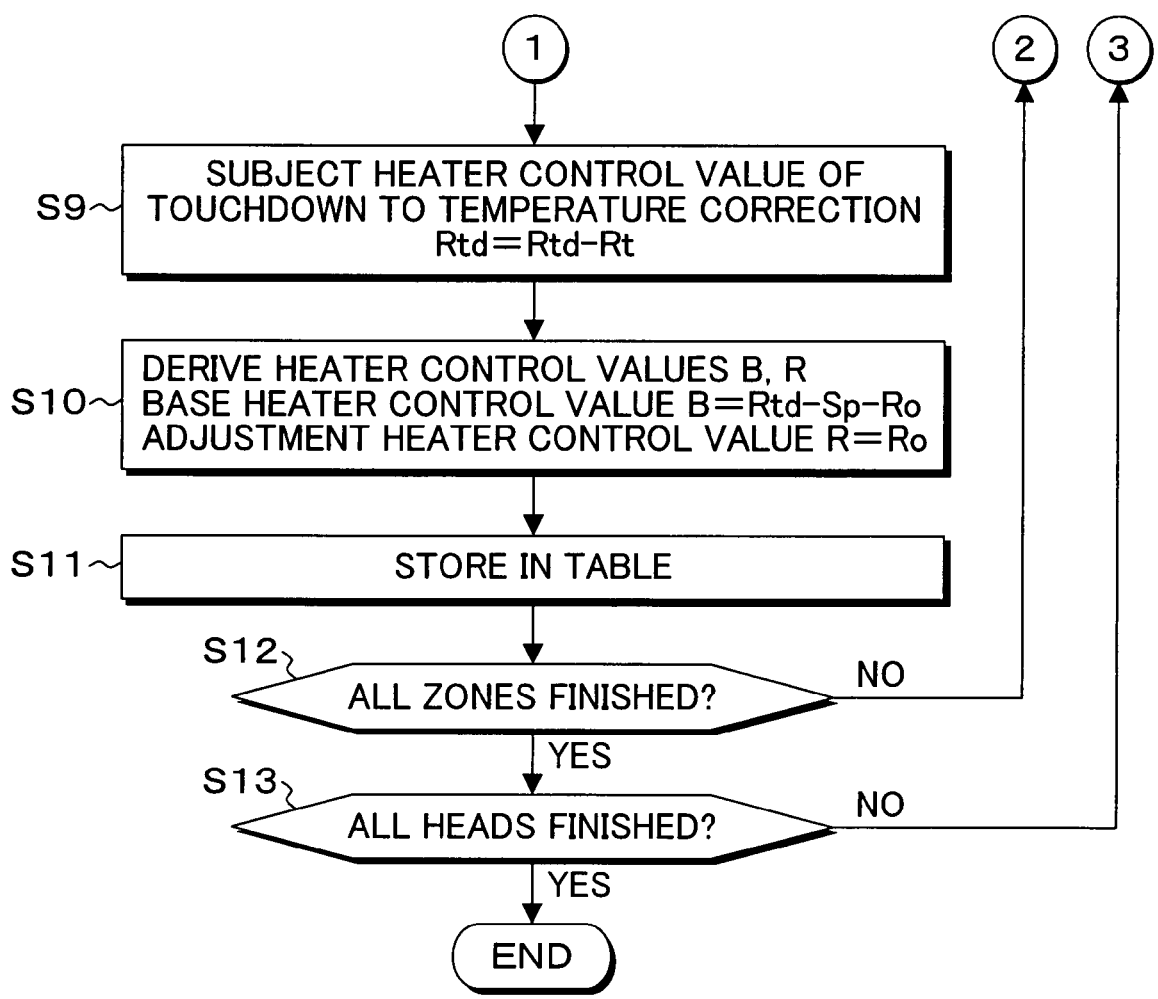

FIGS. 10A and 10B are flow charts showing details of the heater control value measurement process in the present embodiment. In FIGS. 10A and 10B, the heater control value measurement process is executed in the correction process, for example, in an examination process in a production stage; wherein, in the first place, a head is selected in step S1, and subsequently in step S2, a zone on the medium surface of the magnetic disk corresponding to the selected head is selected. In the present embodiment, the case in which all the zones of the recording medium are selected for all the heads to execute the heater control value measurement process is taken as an example. Subsequently in step S3, seek to a predetermined adjustment track of the selected zone is carried out, and it is placed on the track; then, in step S4, after the default control values $B_0$, $R_0$ of the base heater control value B and the adjustment heater control value R which are written in the parameter table 50 in advance shown in FIG. 4 before adjustment are read and saved, the parameter table 50 is initialized to initial values (for example, 0x01 in hexadecimal). Subsequently, in step S4, in the state in which the adjustment heater control value $R_0$ of the saved default is set in the adjustment heater control value resistor 100 of FIG. 5 while, for example, "0x01" which is a minimum value is set in the base heater control value resistor 98 and heater control is turned off, the heater is turned on according to the heater control values in step S5. Subsequently, a touchdown detection process is performed in step S6, and the touchdown detection process is repeated while increasing the adjustment heater control value by the certain value ΔR at each time in step S6 until touchdown is determined in step S7. When touchdown is determined in step S7, the heater control value obtained upon the touchdown is saved as the touch down heater control value Rtd in step S8. Subsequently, in step S9, temperature correction of the touchdown heater control value Rtd is performed. In the temperature correction, a temperature difference ΔT between a normal temperature in the apparatus which is determined in advance, for example, 30° C. and the current apparatus temperature is obtained for the touchdown heater control value Rtd, a temperature correction control value Rt is obtained by multiplying the temperature difference ΔT by the heater control value per the temperature of 1° C. as a temperature coefficient, and the temperature correction value Rt is subtracted from the touchdown heater control value Rt saved in step S8, thereby obtaining the touchdown heater control value Rtd reduced to the normal temperature of 30° C. Herein, the normal temperature 30° C. in the apparatus is determined as the normal temperature in apparatus when the normal temperature outside the apparatus is 20° C. since the temperature in the apparatus is normally higher than the ambient temperature by about 10° C. Subsequently, in step S10, the base heater control value B and the adjustment heater control value R are obtained from the touchdown heater control value Rtd. The base heater control value B is obtained as $$B = Rtd - Sp - R_0.$$

Herein, Sp is the heater control value converted from the minimum space $d_0$, and $R_0$ is the initial value of the adjustment heater control value. The adjustment heater control value R is $$R = R_0, \text{ and}$$

it is the initial value $R_0$ of the adjustment heater control value per se. The thus measured base heater control value B and the adjustment heater control value R are stored in step S11 at corresponding positions in the parameter table 50 shown in FIG. 4. Subsequently, whether all the zones have been finished or not is checked in step S12; and, if unfinished, the process proceeds to step S2, a next zone is selected, and the processes of steps S3 to S11 are repeated. When finish of all the zones is determined in step S12, the process proceeds to step S13 in which whether all the heads have been finished or not is checked; and, if unfinished, the process returns to step S1, a next head is selected to repeat the process from step S2, and the series of processes is finished when all the heads are finished.

Note that, in the embodiment of FIGS. 10A and 10B, the measurement process of the heater control values is executed for all the heads and all the zones of the recording mediums corresponding to the heads; however, it has to be suppressed to requisite minimum depending on the cases since the heater control value measurement process involves medium contact due to touchdown caused by thermal expansion of the heads. Therefore, as another heater control value measurement process in the present embodiment, for example, one part of a system zone may be used as an adjustment track for a recording medium to execute a measurement process, and the base heater control value B and the adjustment heater control value R obtained by this adjustment process may be registered as a value that is common to all the zones of all the heads of the parameter table 50 which is prepared as shown in FIG. 4. As another embodiment of the heater control value measurement process in the present embodiment, the measurement process of FIGS. 9A to 9C may be executed in two zones, which are an outermost zone and an innermost zone in the recording medium, to obtain the base heater control values B and the adjustment heater control values R, respectively, and, regarding the zones between the measures zones, heater control values may be calculated by interpolation calculations of the measurement values of the measurement zones and registered in the parameter table 50 of FIG. 4. It goes without saying that the process of measuring the heater control values in part of the zones may be performed at three locations or four locations, in addition to the outermost and innermost two locations. Next, an adjustment process by the write assist adjustment unit 80 provided in the correction processing unit 46 shown in FIG. 3 will be explained.

Figures 11A, 11B, 11C:
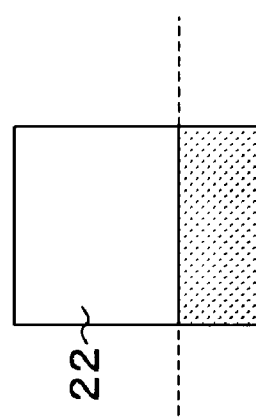
FIGS. 11A to 11C are explanatory diagrams of heater control in a base heater control value fixed mode in the write assist adjustment process of the present embodiment.

FIGS. 11A to 11C are explanatory diagrams of heater control in a base heater fixed mode in the write assist adjustment process of the present embodiment. The adjustment heater control value R obtained in the heater control value measurement process of FIGS. 10A and 10B is the initial value (designed value) $R_0$ per se of the adjustment heater control value which is determined in advance as default, and it is not the value corresponding to the variations of actual positions in radius direction of the heads or media; therefore, actual data write has to be performed for adjustment tracks separately for the heads and zones so as to determine optimal adjustment heater control values. In the write assist adjustment process, the unadjusted adjustment heater control value R obtained in the heater control value measurement process of FIGS. 10A and 10B is adjusted to the heater control value that improves characteristic deterioration in the sectors which are immediately after recording is started wherein preheating is switched to write heating in write access.

FIG. 11A shows a first process in the write assist adjustment process; and, in the first process, a recording process using user data as test data is performed by the write clearance control unit 94 of FIG. 3 by heater electric power distribution according to the heater control value (B+R), which is obtained by adding the base heater control value B to the unadjusted adjustment heater control value R obtained as heater control values by the heater control value measurement process of FIGS. 10A and 10B, and, subsequently, a reproduction process is performed by the read clearance control unit 96 so as to measure the deterioration state of the characteristic in the recording area immediately after recording is started wherein preheating is switched to write heating.

Figure 12:
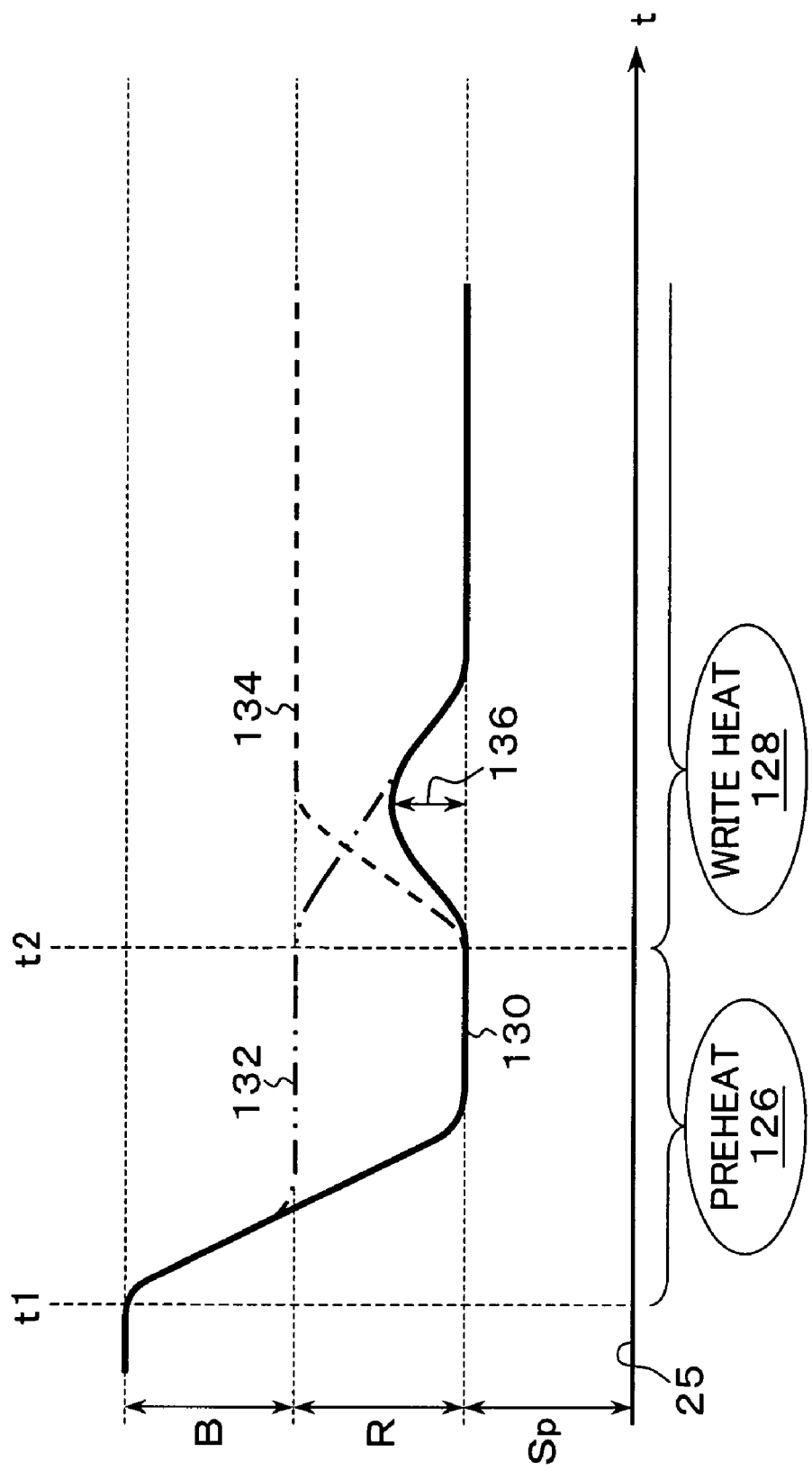
FIG. 12 is an explanatory diagram showing change of the head surface of FIGS. 11A to 11C by a heater control value before adjustment.

FIG. 12 is an explanatory diagram showing change of the head surface in the first write access of FIG. 11A, i.e., the recording process by the unadjusted heater control value. In FIGS. 11A to 11C, in the first place, preheating is started at time t1 from a position that is before a target sector by the number of predetermined set sectors, and it is heating control of the heater by the heater control value at this point that is the heater control value (B+R) obtained by adding the base heater control value B to the unadjusted heater control value R. At time t2 when the process of the set sector number by the preheating 126 is finished and it reaches a target sector, the heater heating by the adjustment heater control value R is stopped, and it is switched to heater electric power distribution merely by the base heater control value B. At the same time, recording by the user data is started at time t2, and a head recording current is caused to flow. As a result of such heater control in the recording process, as shown by a change characteristic 130 of a solid line, the head surface is protruded by heating of the heater by the added heater control value (B+R) at the time t1, and the head surface is stabilized to the state of the clearance of the minimum space $d_0$. When it reaches a recording starting sector at time t2, heater control is performed merely by the base heater control value B, and write by a recording current is performed at the same time; thus, the head change characteristic 130 is stabilized again to the minimum space d0 after clearance increase 136 is generated with respect to the minimum space $d_0$. Along with the clearance increase 136 immediately after write heating 128 of the time t2 is started, the characteristic is deteriorated immediately after recording is started. Regarding the ratio of the clearance increase 136 immediately after the recording is started, the clearance increase 136 is generated as a synthesized characteristic of a head surface change characteristic 132 of the case in which, after the heater is heated merely by the base heater control value B upon preheating, the write current is caused to flow at the time t2 and a head surface change characteristic 134 of the case in which the recording current is not caused to flow when it is switched to the write heating 128. Therefore, in the write assist adjustment process of the present embodiment, the clearance increase 136 immediately after write heating is started is reduced while gradually increasing the adjustment heater control value R in the preheating 126 by the certain value ΔR at each time, thereby improving the performance deterioration immediately after write is started.

FIG. 13 shows change of the head surface by heater control in a second write assist adjustment process of FIG. 11B. In the heater control in the second write assist adjustment process of FIG. 11B, the adjustment heater control value R is increased by the certain value ΔR, and the clearance corresponding to a head surface 118-1 is reduced in addition to a head surface 118.

FIG. 13, namely, shows change of the head surface in the second heater control of FIG. 11B in addition to that of the first time of FIG. 12. In FIG. 13, by virtue of the second preheating 126 in which the adjustment heater control value is (R+ΔR), the head surface shows a change characteristic 130-1 of the head surface that is further protruded than the first time, and clearance increase 136-1 is generated immediately after write is started from the time t2 as a synthesized characteristic of a head surface change characteristic 132 of the case when the write current is not caused to flow at the time t2 at that point and a head surface change characteristic 134-1 of the case when the write current is caused to flow after the preheating 126 merely by the base heater control value B. The clearance increase 136-1 of this case is decreased corresponding to increase of the adjustment heater control value R by ΔR compared with the clearance increase 136 shown in FIG. 12; therefore, deterioration of the characteristic immediately after write is started is improved.

FIGS. 14A to 14D are explanatory diagrams of a measurement process for measuring the degree of improvement of the characteristic deterioration immediately after write is started in the write assist adjustment process which is performed while increasing the adjustment heater control value R shown in FIG. 12 and FIG. 13 by the certain value ΔR at each time.

Figure 14A:
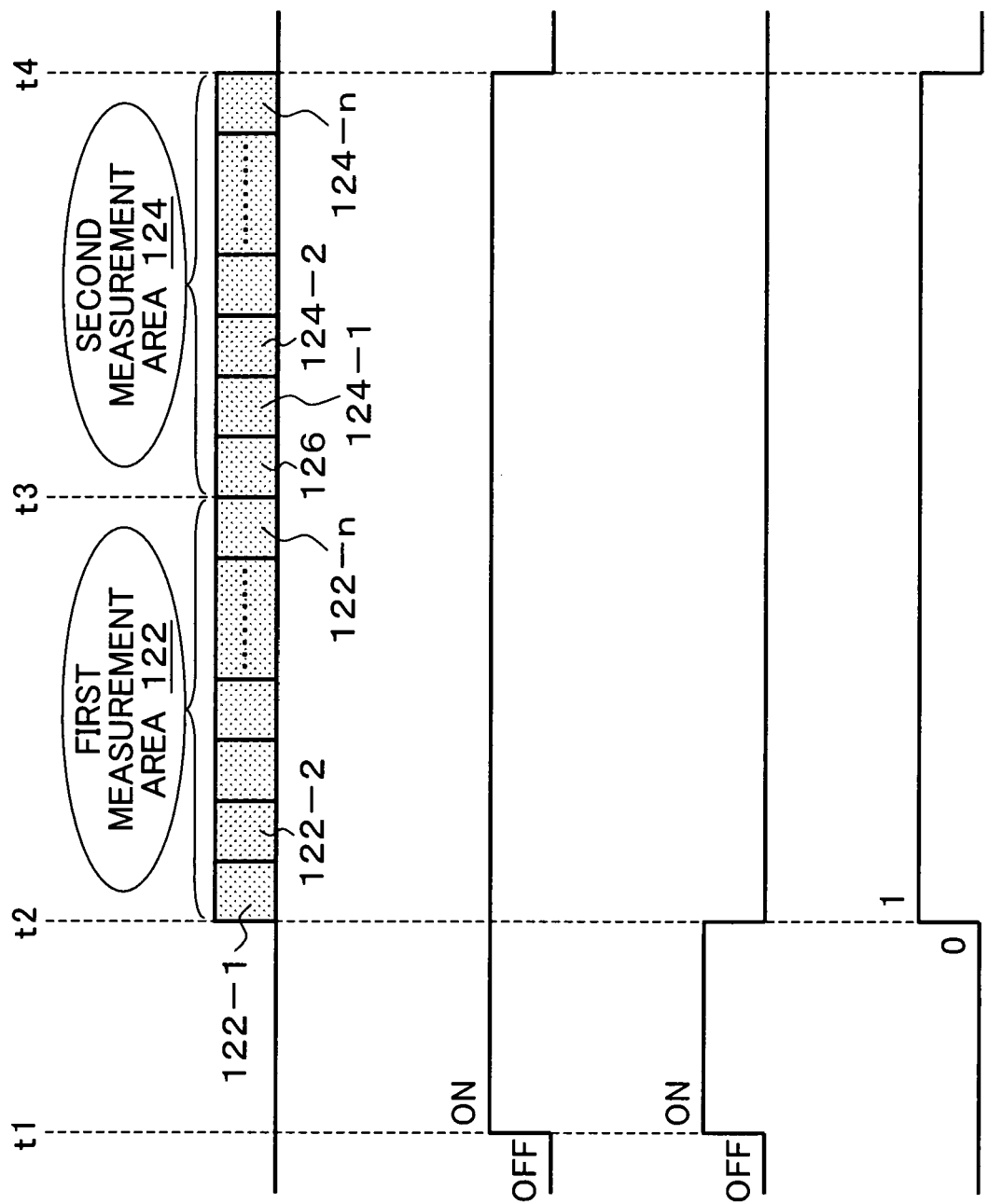

In FIGS. 14A to 14D, regarding the adjustment track in the write assist adjustment process, as shown in FIG. 14A, the part from preheating starting time t1 to write writing starting time t2 is set as the set sector number for preheating, and an adjustment object area from the time t2 until t4 is divided into a first measurement area 122 of time t2 to t3 and a second measurement area 124 of time t3 to time t4. For example, 100 sectors from the sector number 0 are allocated to the first measurement area 122, and 110 sectors from the 100th sector are allocated to the second measurement area 124. Herein, the top 10 sectors of the second measurement area 124 are excluded from the measurement range in the second measurement area 124 as bad sectors that may involve characteristic deterioration. Therefore, in practice, the second measurement area 124 is the area of 100 sectors from the 110th sector. Furthermore, the first measurement area 122 is divided at every set sector number into blocks 122-1 to 122-n, and the second measurement area 124 is also divided at every set sector number into blocks 124-1 to 124-n. In the process of the write assist adjustment process, as shown in the write assist adjustment unit 80 of FIG. 3, the area setting unit 82 sets the first measurement area 122 and the second measurement area 124 shown in FIGS. 14A to 14D. For such measurement areas, the first adjustment recording unit 84 executes a first write process. In the first write process, as shown in FIGS. 14B and 14C, each of the base heater control value B and the adjustment heater control value R is turned on upon preheating start at time t1, and electric power is distributed to heat the heater by the added heater control value (B+R). When it reaches the top sector of the first measurement area 122 at the time t2, switch to write heating is carried out; therefore, the adjustment heater control value R of FIG. 14C is turned off, and electric power distribution and heating of the heater by the base heater control value B of FIG. 14B is performed. At the same time, a write gate WG of FIG. 14D is set from 0 to 1, successive writing of user data with respect to the first measurement area 122 and the second measurement area 124 using the user data is performed, and the base heater control value B and the write gate WG are respectively turned off at time t4 when the write is finished. Subsequently, a recording process by the second adjustment recording unit 86 of FIG. 3 is performed. In the recording process by the second adjustment recording unit 86, first of all, as shown in FIGS. 15A to 15D, write of user data with respect to the top block 122-1 of the first measurement area 122 is performed. More specifically, at time t11, as shown in FIGS. 15 B and 15C, the base heater control value B and the adjustment heater control value R are turned on to distribute electric power to and heat the heater; and, when it reaches the starting position of the first measurement area 122 at time t12, the adjustment heater control value R is turned off, the write gate WG is turned on at the same time, and the user data is written to the top block 122-1.

FIGS. 16A to 16D show write of the user data to the next block 122-2 which is performed subsequent to the block 122-1 of FIGS. 15A to 15D. In this manner, the user data is repeatedly written sequentially to the blocks 122-1 to 122-n of the first measurement area 122. Herein, an object of the successive write of the user data with respect to the first measurement area 122 and the second measurement area 124 shown in FIGS. 14A to 14D by the first adjustment recording unit 84 is to perform data write to the blocks 124-1 to 124-n of the second measurement area 124 in the state in which the head surface caused by thermal expansion is stabilized by starting write heating at the time t2. On the other hand, in the sequential write of the user data of FIGS. 15A to 15D and FIGS. 16A to 16D with respect to the blocks 122-1 to 122-n of the first measurement area 122, each of the blocks 122-1 to 122-2 is caused to be in the recording state immediately after write is started. When such write with respect to the first measurement area 122 and the second measurement area 124 is finished, the characteristic evaluation value detection unit 88 shown in FIG. 3 performs a reproduction process by the read clearance control unit 96, thereby reading the recorded data in the first measurement area 122 and the second measurement area 124.

FIGS. 17A to 17D are time charts of a reproduction process of the first measurement area 122 and the second measurement area 124. In the reproduction process, as well as the case of the recording process, preheating by the heater control value (B+R) is started at time t1, and, when it reaches the top sector of the first measurement area 122 at time t2, a read gate RG is turned on to start a reproduction operation. The heater control value at this point maintains (B+R). Subsequently, preheating by the heater control value (B+R) is started at time t1', and, when it reaches the top sector of the second measurement area 124 at time t2', a reproduction operation of the second measurement area 124 is performed. This operation is performed a plurality of times, and the VMM values of the first measurement area 122 and the second measurement area 124 at this point are stored. Regarding the read data obtained in the reproduction operation, in the present embodiment, VMM (Viterbi metric margin) is detected as a performance evaluation value for each of the blocks 122-1 to 122-n for the first measurement area 122, and VMM1 of the first measurement area 122 is obtained as a mean value thereof. Similarly, also for the second measurement area 124, VMM is obtained for each of the blocks 124-1 to 124-n, and VMM2 of the second measurement area 124 is obtained as a mean value thereof. Herein, in the unadjusted state of the adjustment heater control value R, there is relation that the VMM2 of the second measurement area 124 is lower than the VMM1 of the first measurement area 122 in which characteristic deterioration occurs. Therefore, in the present embodiment, (VMM2+a) in which a predetermined threshold value a is added to the VMM2 of the second measurement area 124 in which the characteristic is normal is compared with the VMM1 of the first measurement area 122, and the adjustment heater control value R when the relation that $$VMM1 < (VMM2+a)$$

is obtained is detected as an optimal value and registered in the parameter table 50 as an adjusted adjustment heater control value R. The write assist adjustment process of the present embodiment has two adjustment modes of (1) a base heater control value variable mode and (2) a base heater control value fixed mode.

FIGS. 11A to 11C are in the base heater control value fixed mode, wherein, as shown in FIGS. 11B and 11C, the adjustment heater control value R is increased by the certain value ΔR at each time to perform the adjustment process; however, the base heater control value B is a constant value and is not changed. On the other hand, in the base heater control value variable mode, as shown in FIGS. 18B and 18C, the base heater control value B of the case when the adjustment heater control value R is increased by the certain value ΔR is decreased so that $$B=B-\Delta R.$$

Therefore, in the base heater control value fixed mode of FIGS. 11A to 11C, when the adjustment heater control value R is increased by the certain value ΔR at each time, in the adjusted case of, for example, FIG. 11C, $$R=R+2\Delta R,$$

and this value is registered in the parameter table without change. Therefore, for example in the preheating upon reproduction and recording of FIG. 6B, change of the head surface by the heater control value (B+R), which is obtained by adding the base heater control value B to the adjustment heater control value R, provides a clearance that is further smaller than the minimum space $d_0$. On the other hand, in the base heater control value variable mode of FIGS. 17A to 17D, for example as shown in FIG. 18C, even when the adjustment heater control value R is increased by 2ΔR, the base heater control value is related thereto so that it is correspondingly reduced; therefore, the total heater control value is same as that in the first time of FIG. 18A, that is the heater control value (B+R) before adjustment, and the minimum space $d_0$ is not changed even when the write assist adjustment is performed. Herein, regarding the base heater control value B, temperature correction is performed in step S9 in the heater control value measurement process in FIGS. 10A and 10B; and, since the degree of dependency according to the temperature correction is reduced in the base heater control value variable mode of FIGS. 18A to 18C, the base heater control value variable mode may be unstable when the environmental temperature of the apparatus is varied. On the other hand, in the base heater control value fixed mode of FIGS. 11A to 11C, since the control value is not changed in power adjustment, it can be said that the effect of temperature correction is large. Therefore, it is desired that, for example, the power assist adjustment process according to the base heater control value fixed mode of FIGS. 11A to 11C is performed when variation in the apparatus usage temperature is large, and the write assist adjustment process according to the base heater control value variable mode shown in FIGS. 18A to 18C is performed when variation in the apparatus usage temperature is small. As a matter of course, it can be arbitrarily selected in accordance with needs whether it is to be the fixed mode or the variable mode.

Figure 19A:
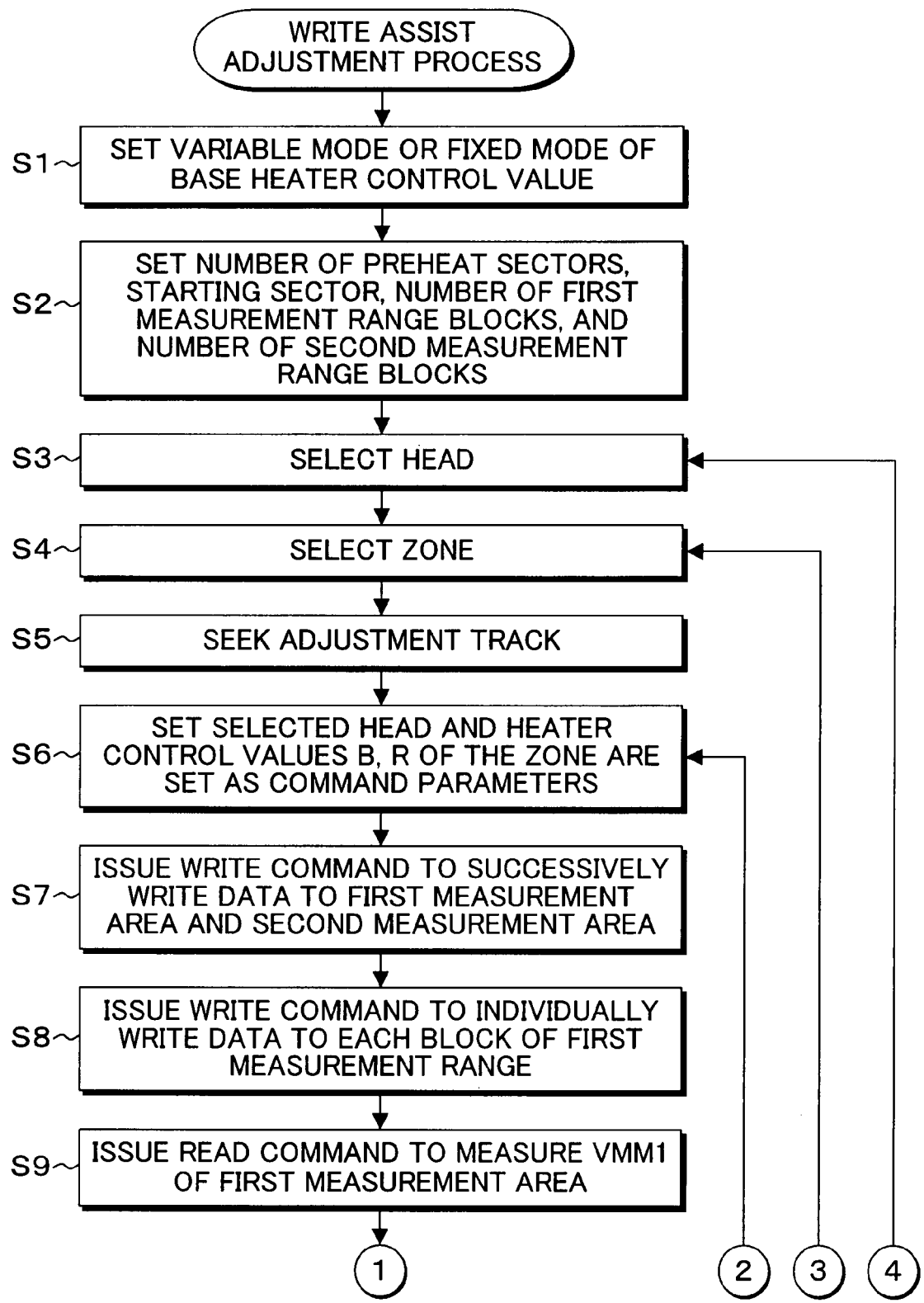
Figure 19B:
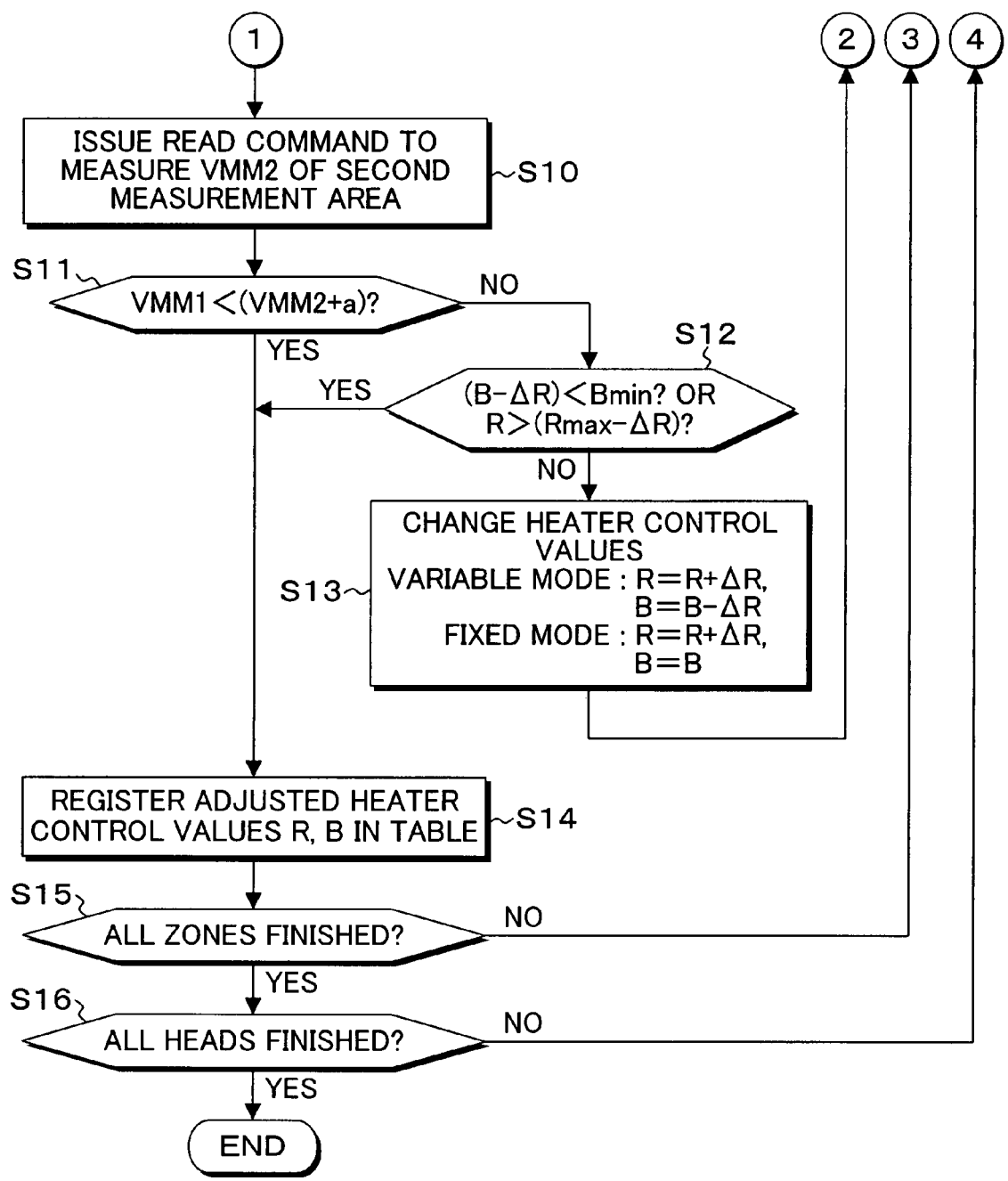

FIGS. 19A and 19B are flow charts of the write assist adjustment process according to the present embodiment, and it will be explained below with reference to FIG. 3. In FIGS. 19A and 19B, first to fall, in step S1, either the variable mode or the fixed mode of the base heater control value B is set. Subsequently, in step S2, the number of preheating sectors, the starting sector, the number of first measurement area blocks, the number of second measurement area blocks, the number of skipping bad sectors, etc. are set by the area setting unit 82 of FIG. 3. Subsequently, a head is selected in step S3;

and, subsequently, a zone of the recording medium corresponding to the selected head is selected in step S4. Next, seek to an adjustment track is performed in step S5; and, in step S6, the heater control values B and R of the selected head and zone are read from the parameter table 50 of FIG. 4 and set as command parameters. Next, in step S7, a write command is issued, and data is successively written to the first measurement area and the second measurement area. Next, in step S8, write commands are issued, and data is individually written to each of the blocks of the first measurement area. In the data individual write for each of the blocks, the write command is issued for each block to perform write. Next, in step S9, read commands are issued to measure the error detection rate VMM1 of the first measurement area a plurality of times, and the mean value thereof is obtained. Next, in step S10, read commands are issued to measure the error detection rate VMM2 of the second measurement area a plurality of times, and the mean value thereof is obtained. Note that, as the processes of steps S9 and S10, the first measurement area and the second measurement area may be read by one read command, and the VMM1 and VMM2 may be respectively measured. Next, in step S11, whether the VMM1 of the first measurement area is smaller than (VMM2+a), which is obtained by adding the predetermined value a to the VMM2 of the second measurement area, or not is determined. If the determination condition of step S11 is not satisfied, the process proceeds to step S12 wherein it is determined that whether the current decreased value (B−ΔR) of the base heater control value B is not equal to or less than a minimum value Bmin when the variable mode of the base heater control value is set and whether the adjustment heater control value R is not larger than the value that is obtained by subtracting the certain value ΔR from a maximum value Rmax when the fixed mode of the base heater control value is set; if neither of them is satisfied, the process proceeds to step S13 wherein the heater control values are changed. Also in this case, when the variable mode of the base heater control value is set, the adjustment heater control value R is increased by the certain value ΔR, and, at the same time, the base heater control value B is decreased by the predetermined value ΔR. Meanwhile, when the fixed mode of the base heater control value is set, although the adjustment heater control value R is increased by the predetermined value ΔR, the base heater control value B is not changed but is used as a fixed value. When the heater control value change of step S13 is finished, the process returns to step S6, and the processes of steps S6 to S11 using the changed heater control values are repeated. When the condition of step S11 is satisfied through the repeated process of the detection processes of the VMM1 and MM2 of the first measurement area and the second measurement area using the write processes and read processes, which are performed while changing such heater control values, the process proceeds to step S14 wherein the adjustment heater control value R and the base heater control value B at that point are registered in the parameter table 50 of FIG. 4 as adjusted heater control values. Herein, if it is equal to or less than the minimum value Bmin (variable mode) or exceeds the maximum value Rmax (fixed mode) in step S12, it has reached a limit value even though the characteristic deterioration of step S11 is not improved; therefore, the adjustment heater control value R and the base heater control value B are registered in the parameter table 50 as adjusted control values in step S14. Subsequently, in step S15, whether all the zones have been finished or not is checked; and, if unfinished, the process proceeds to step S4 wherein a next zone is selected and similar processes are repeated. When finish of all the zones is determined in step S15, the process proceeds to step S16 wherein whether all the heads have been finished or not is determined; and, if unfinished, the process returns to step S3 wherein a next head is selected, and the processes from step S4 are repeated. Note that, in the write assist adjustment process of FIGS. 19A and 19B, the adjustment of the adjustment heater control value R for improving the characteristic deterioration immediately after write is started is performed for all the zones of the recording media corresponding to all the heads; however, when measurement is performed with an adjustment track at one location of a recording medium in the heater control value measurement process of FIGS. 10A and 10B, the measurement process is performed with the adjustment track of the same location also for the assist adjustment process of FIGS. 19A and 19B, and the measured result is registered as a value common to all the zones. When it is performed at partial zones of the recording medium, for example, the outermost zone and the innermost zone at two locations in the heater control value measurement process of FIGS. 10A and 10B, measurement processes are performed at the two locations, the outermost zone and the innermost zone, similarly in the write assist adjustment process of FIGS. 19A and 19B, and adjusted heater control values of the measurement zones of the zones therebetween are obtained by interpolation calculations and registered in the parameter table 50.

Figure 20:
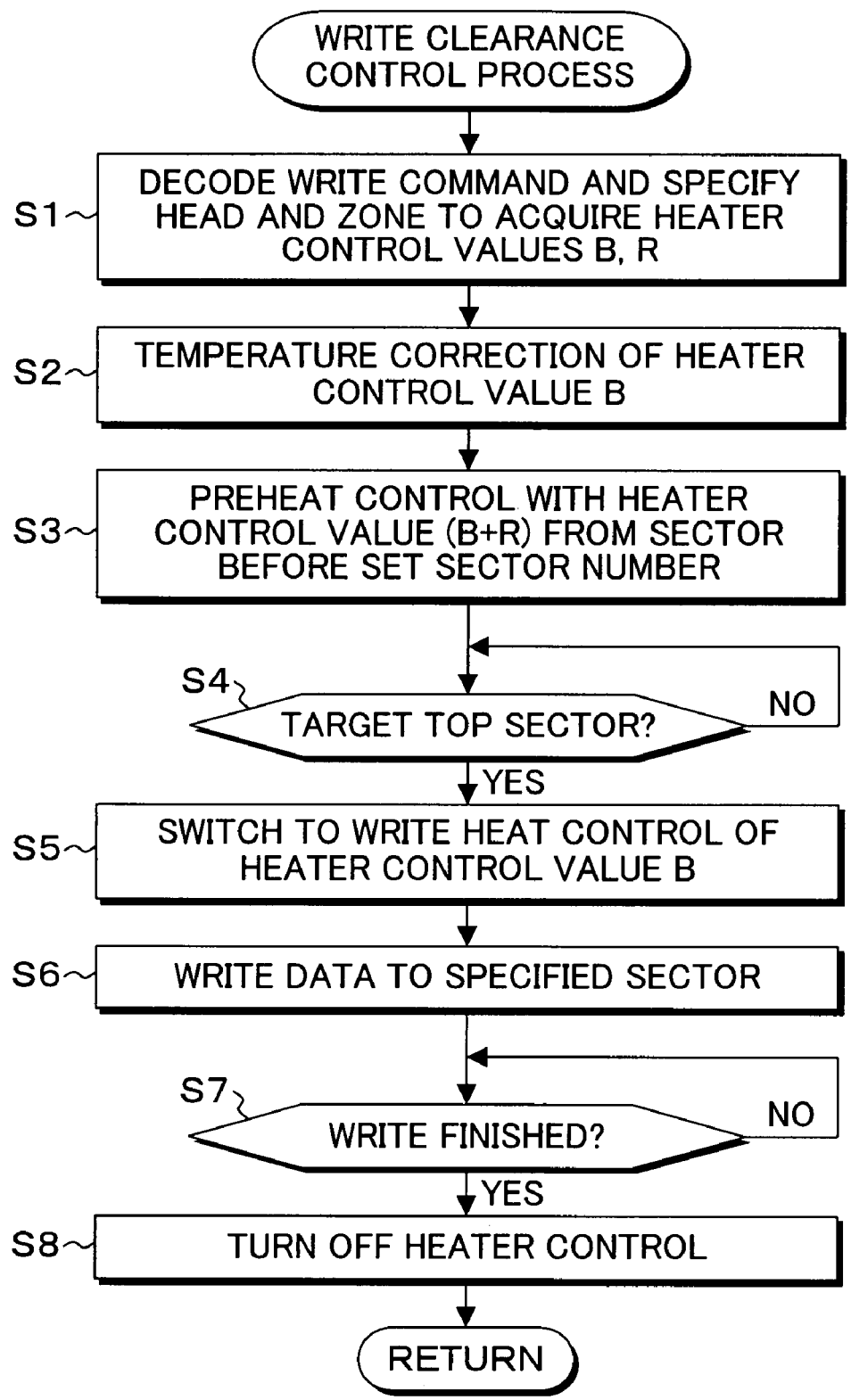
FIG. 20 is a flow chart showing a write clearance control process according to the present embodiment.

FIG. 20 is a flow chart showing a write clearance control process according to the present embodiment, and it is performed by the write clearance control unit 94 of FIG. 3. In FIG. 20, in the write clearance control process, first of all, in step S1, a write command is decoded to recognize a target track and specify a head and a zone so as to reference the parameter table 50 of FIG. 4 and acquire the base heater control value B and the adjustment heater control value R. Subsequently, in step S2, the acquired base heater control value B is subjected to temperature correction. In the temperature correction, since the heater control value at a normal temperature in the apparatus of 30° C. is registered in the parameter table 50 of FIG. 4, the current temperature T in the apparatus is read, and the temperature difference ΔT with the normal temperature is calculated as $$\Delta T = T - 30° \text{ C.};$$

and, a temperature correction value Bt is obtained by multiplying that by a coefficient for conversion to the heater control value per unit temperature, and correction is performed so that B=B+Bt. Herein, if the temperature in the apparatus is higher than 30° C., the temperature correction value Bt becomes a negative value, and the base heater control value B is corrected to a value which is lower by the amount corresponding to the temperature correction value Bt. When the temperature in the apparatus is less than 30° C., the temperature correction value Bt becomes a positive value, and the base heater control value B is corrected to a value which is higher by the amount corresponding to the temperature correction value Bt. Next, in step 3, preheating control is performed by the heat control value (B+R) from a sector that is before a set sector number. Subsequently, in step S4, a target top sector is checked; and, when arrival to the target top sector is determined, it is switched to write heat control of the heater control value B in step S5, data is written to specified sectors in step S6, and, when write finish is determined in step S7, the heater control is turned off in step S8.

Figure 21:
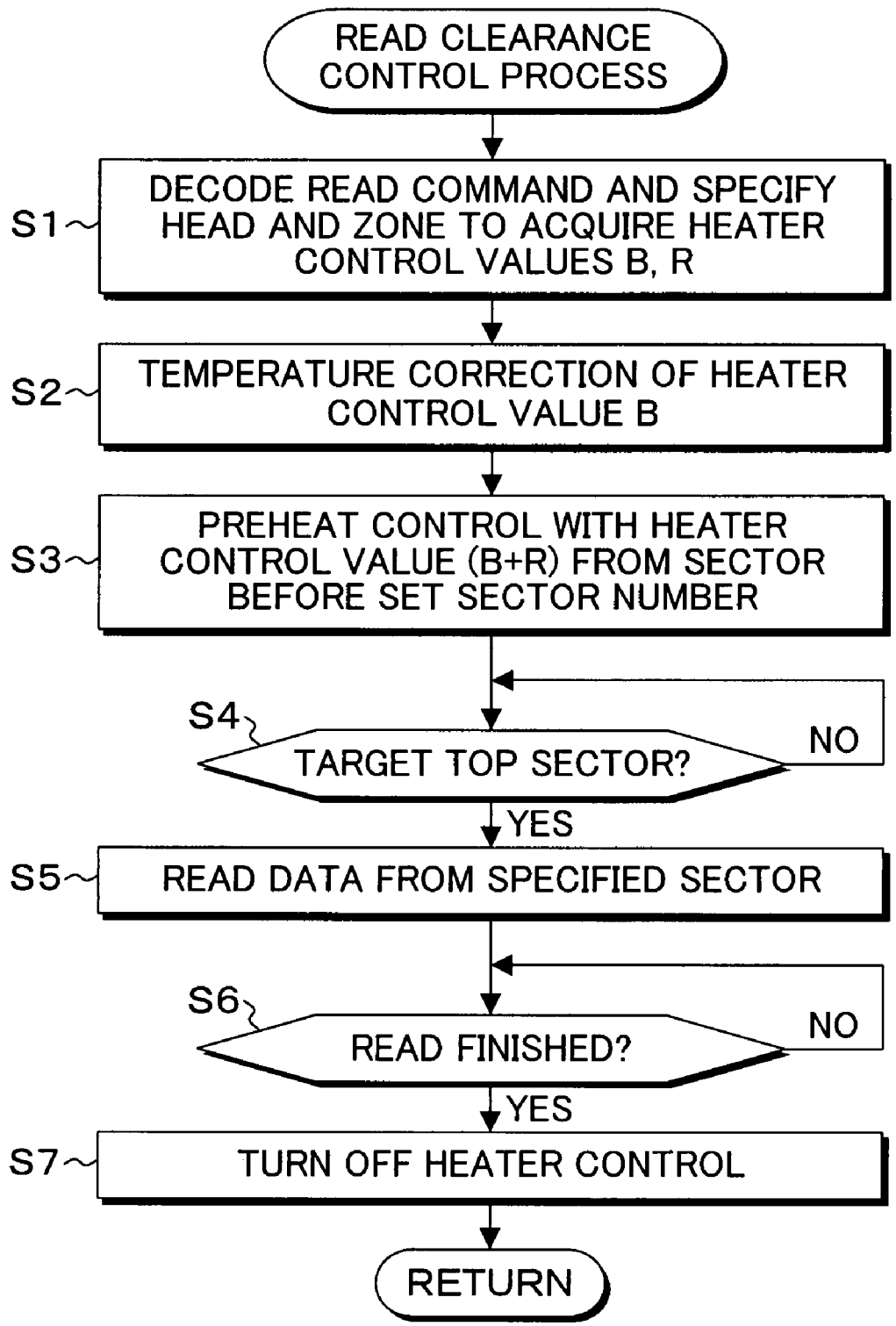
FIG. 21 is a flow chart showing a read clearance control process according to the present embodiment.

FIG. 21 is a flow chart showing a read clearance control process according to the present embodiment, and it is executed by the read clearance control unit 96 of FIG. 3. In FIG. 21, in the read clearance control process, first of all, in step S1, a read command is decoded to recognize a target track and specify a head and a zone so as to reference the parameter table 50 of FIG. 4 and acquire the base heater control value B and the adjustment heater control value R. Subsequently, in step S2, the acquired base heater control value B is subjected to temperature correction. In the temperature correction, since the heater control value at a normal temperature of 30° C. is registered in the parameter table 50 of FIG. 4, the current temperature T in the apparatus is read, and the temperature difference ΔT with the normal temperature is calculated as $$\Delta T = T - 30° \text{ C.};$$

and, a temperature correction value Bt is obtained by multiplying that by a coefficient for conversion to the heater control value per unit temperature, and correction is performed so that B=B+Bt. Subsequently, in step S3, preheat control is performed by the heater control value (B+R) from a sector that is before a set sector number. Subsequently, when arrival to a target top sector is determined in step S4, the process proceeds to step S5 wherein read is started while keeping the heater control value (B+R) without change. Then, when read finish is determined in step S6, the heater control value is turned off in step S7. The present invention also provides programs for the correction processes executed by the MPU 26 which is provided in the magnetic disk apparatus of FIG. 1, i.e., firmware programs for the correction process, and the firmware programs have processing contents shown in the flow charts of FIGS. 7, 10A, 10B, 19A and 19B. The present invention also provides the control device of the magnetic disk apparatus of FIG. 1, and the control device corresponds to the control device 15 which is realized as an LSI device mounted on the control board 12 of FIG. 1 in the present embodiment. The present invention also provides programs for the write clearance control and the read clearance control shown in FIG. 20 and FIG. 21, and the programs have processing contents shown in respective flow charts. Note that, in the present embodiment, as shown in FIG. 5, the base heater control value resistor 98 and the adjustment heater control value resistor 100 are provided in the MPU 26 side, and, corresponding to them, the DA converters 102 and 104 are provided in the head IC 24 side respectively for the resistors; however, a single DA converter may be provided in the head IC 24 side for the two resistors in the MPU 26 side, and heater control may be performed by inputting each of the values of the resistors or an added value to the DA converter and subjecting them to DA conversion. Moreover, in the above described embodiment, upon write clearance control and read clearance control, among the base heater control value B and the adjustment heater control value R acquired from the parameter table 50, the base heater control value B is subjected to temperature correction to a heater control value corresponding to the temperature in the apparatus at that point; however, the adjustment heater control value R may be also subjected to temperature correction to a heater control value corresponding to the temperature in the apparatus. Moreover, in the above described embodiment, the case in which the heater control values input to the DA converters for obtaining the heater electric power amount are set in the parameter table 50 to perform the correction process instead of the heater electric power amount is employed as an example; however, the correction process may be performed with the value of the heater electric power per se corresponding to the heater control values instead of handling it as the heater control values. In this case, the base heater control value B may be treated as heater electric power amount Pd according to an output current converted by the DA converter 102, and the adjustment heater control value R may be handled as heater electric power Pr according to the output current converted by the DA converter 104. As a mater of course, the minimum space control value Sp is also handled as a minimum space electric power value Psp converted into the heater electric power amount. Moreover, the above described embodiment employs, as an example, the case in which firmware of the correction process is installed in the magnetic disk apparatus in an examination process upon production to perform the correction process, and it is shipped to a user in the state that the firmware of the correction process is deleted after the correction process is finished; however, when it is shipped to the user when it remains without deleting the firmware of the correction process, the user may perform the parameter correction process of the present embodiment in accordance with needs during usage. Moreover, the present invention includes arbitrary modifications that do not impair the object and advantages thereof and is not limited by the numerical values shown in the above described embodiment.

What is claimed is:

1. A control device of a storage apparatus having a head which has a reading element and a recording element, is provided with a heater which changes a protrusion value by thermal expansion involved in electric power distribution and heating, and accesses data by flying above a rotating recording medium, the control device characterized by having a parameter administration unit which registers and administers a base heater control value which sets electric power supplied to the heater upon preheating, recording, and reproduction and an adjustment heater control value which sets electric power supplied to the heater upon preheating and reproduction except for recording;

a write clearance control unit which, upon recording, performs preheating by electric power distribution to the heater by a control value, which is obtained by adding the base heater control value to the adjustment heater control value, from a sector position which is before by a predetermined set sector number and switches the electric power distribution to that merely by the base heater control value when the head reaches the target sector so as to perform write heating;

a read clearance control unit which, upon reproduction, performs preheating by electric power distribution to the heater by the control value, which is obtained by adding the base heater control value to the adjustment heater control value, from a sector position which is before by the set sector number and maintains the control value when the head reaches a target sector so as to perform read heating;

a heater control value measurement unit which, upon desired correction, measures a contact heater control value when the head is brought into contact with a medium surface while gradually increasing the adjustment heater control value from a predetermined initial value, sets the initial value to the adjustment heater control value, and sets the value, which is obtained by subtracting a minimum clearance heater control value corresponding to a predetermined minimum clearance and the initial value from the contact heater control value, as a base heater control value; and a write assist adjustment unit which adjusts the adjustment heater control value measured by the heater control value measurement unit to a heater control value which improves characteristic deterioration immediately after recording is started wherein preheating is switched to write heating.

2. The control device according to claim 1 characterized in that the write assist adjustment unit has
- an area setting unit which sets a first measurement area and a second measurement area, which are divided into a plurality of blocks wherein one block comprises a plurality of sectors, in a measurement track used in write/read upon adjustment;
- a first adjustment recoding unit which initially sets the base heater control value and the adjustment heater control value measured by the heater control value measurement unit and records data in the first measurement area and the second measurement area by the write clearance control unit;
- a second adjustment recording unit which initially sets the base heater control value and the adjustment heater control value set by the heater control value control unit and records data in each block of the first measurement area by the write clearance control unit;
- a characteristic evaluation value detection unit which initially sets the base heater control value and the adjustment heater control value set by the heater control value measurement unit, reads the first measurement area and the second measurement area in block units by the read clearance control unit, and detects a mean value of characteristic evaluation values, which are obtained from read signals of blocks, for each of the first and second measurement areas; and a control value adjustment unit which compares the characteristic evaluation value of the first measurement area with the characteristic evaluation value of the second measurement area, repeats the processes by the first adjustment recording unit, the second adjustment recording unit, and the characteristic evaluation value detection unit while gradually increasing the adjustment heater control value until the difference between them is equal to or less than a predetermined value, and sets the adjustment heater control value when the difference between them is equal to or less than the predetermined value as an adjustment result.

3. The control device according to claim 2, characterized in that the control value adjustment unit gradually increases the adjustment heater control value and, at the same time, gradually reduces the base heater control value by the same value so as to perform adjustment.

4. The control device according to claim 2, characterized in that the control value adjustment unit gradually increases the adjustment heater control value, and fixes the base heater control value to an initial value so as to perform adjustment.

5. The control device according to claim 2, characterized in that the characteristic evaluation value is a Viterbi metric margin, a signal quality monitoring value, or an error rate.

6. The control device according to claim 1, characterized in that the heater control value measurement unit subjects the contact heater control value when the head is brought into contact with the medium surface to temperature correction to a heater control value at a reference temperature in accordance with a temperature difference between a temperature in the apparatus upon correction and the predetermined reference temperature.

7. The control device according to claim 1, characterized in that the parameter administration unit registers and administers the base heater control value and the adjustment heater control value separately for a head and a zone of a recording medium.

8. The control device according to claim 7, characterized in that the heater control value measurement unit and the write assist adjustment unit measure and adjust the base heater control value and the adjustment heater control value separately for heads and all the zones of the recording medium.

9. The control device according to claim 1 characterized in that the heater control value measurement unit and the write assist adjustment unit measure and adjust the base heater control value and the adjustment heater control value for a head and a partial zone among a plurality of zones of a recording medium, and a heater control value obtained from an interpolation calculation from the heater control value of the measurement zone is set for the unmeasured zone.

10. The control device according to claim 1, characterized in that the heater control value measurement unit and the write assist adjustment unit measure and adjust the base heater control value and adjustment heater control value with respect to a particular one track of a recording medium corresponding to the head and sets the measured and adjusted base heater control value and adjustment heater control value to all zones.

11. A control method of a storage apparatus having a head which has a reading element and a recording element, is provided with a heater which changes a protrusion value by thermal expansion involved in electric power distribution and heating, and accesses data by flying above a rotating recording medium, the control method characterized by including
- a parameter administration step in which a base heater control value which sets electric power supplied to the heater upon preheating, recording, and reproduction and an adjustment heater control value which sets electric power supplied to the heater upon preheating and reproduction except for recording are registered and administered;
- a write clearance control step in which, upon recording, preheating is performed by electric power distribution to the heater by a control value, which is obtained by adding the base heater control value to the adjustment heater control value, from a sector position which is before by a predetermined set sector number and the electric power distribution is switched to that by the base heater control value when the head reaches the target sector so as to perform write heating;
- a read clearance control step in which, upon reproduction, preheating is performed by electric power distribution to the heater by the control value, which is obtained by adding the base heater control value to the adjustment heater control value, from a sector position which is before by the set sector number and the control value is maintained when the head reaches a target sector so as to perform read heating;
- a heater control value measurement step in which, upon desired correction, a contact heater control value when the head is brought into contact with a medium surface is measured while gradually increasing the adjustment heater control value from a predetermined initial value, sets the initial value to the adjustment heat control value, and sets the value, which is obtained by subtracting a minimum clearance heater control value corresponding to a predetermined minimum clearance and the initial value from the contact heater control value, as a base heater control value; and
- a write assist adjustment step in which the adjustment heater control value measured by the heater control value measurement unit is adjusted to a heater control value which improves characteristic deterioration immediately after recording is started wherein preheating is switched to write heating.

12. The control method according to claim 11 characterized in that the write assist adjustment step includes an area setting step in which a first measurement area and a second measurement area, which are divided into a plurality of blocks wherein one block comprises a plurality of sectors, are set in a measurement track used in write/read upon adjustment;

a first adjustment recoding step in which the base heater control value and the adjustment heater control value set by the heater control value measurement step are initially set and data is recorded in the first measurement area and the second measurement area in the write clearance control step;

a second adjustment recording step in which the base heater control value and the adjustment heater control value set by the heater control value measurement step are initially set and data is recorded in each block of the first measurement area in the write clearance control step;

a characteristic evaluation value detection step in which the base heater control value and the adjustment heater control value set by the heater control value measurement step are initially set, the first measurement area and the second measurement area are read in block units in the read clearance control step, and a mean value of characteristic evaluation values, which are obtained from read signals of blocks, for each of the first and second measurement areas is detected; and a control value adjustment step in which the characteristic evaluation value of the first measurement area is compared with the characteristic evaluation value of the second measurement area, the processes of the first adjustment recording step, the second adjustment recording step, and the characteristic evaluation value detection step are repeated while gradually increasing the adjustment heater control value until the difference between them is equal to or less than a predetermined value, and the adjustment heater control value when the difference between them is equal to or less than the predetermined value is set as an adjustment result.

13. The control method according to claim 12, characterized in that, in the control value adjustment step, the adjustment heater control value is gradually increased and, at the same time, the base heater control value is gradually reduced by the same value so as to perform adjustment.

14. The control method according to claim 12, characterized in that, in the control value adjustment step, the adjustment heater control value is gradually increased, and the base heater control value is fixed to an initial value so as to perform adjustment.

15. The control method according to claim 11, characterized in that, in the control value measurement step, the contact heater control value when the head is brought into contact with the medium surface is subjected to temperature correction to a heater control value at a reference temperature in accordance with a temperature difference between a temperature in the apparatus upon correction and the predetermined reference temperature.

16. The control method according to claim 11, characterized in that, in the parameter administration step, the base heater control value and the adjustment heater control value are registered and administered separately for a head and a zone of a recording medium.

17. A storage apparatus having a head which has a reading element and a recording element, is provided with a heater which changes a protrusion value by thermal expansion involved in electric power distribution and heating, and accesses data by flying above a rotating recording medium, the storage apparatus characterized by having a parameter administration unit which registers and administers a base heater control value which sets electric power supplied to the heater upon preheating, recording, and reproduction and an adjustment heater control value which sets electric power supplied to the heater upon preheating and reproduction except for recording;

a write clearance control unit which, upon recording, performs preheating by electric power distribution to the heater by a control value, which is obtained by adding the base heater control value to the adjustment heater control value, from a sector position which is before by a predetermined set sector number and switches the electric power distribution to that by the base heater control value when the head reaches the target sector so as to perform write heating;

a read clearance control unit which, upon reproduction, performs preheating by electric power distribution to the heater by the control value, which is obtained by adding the base heater control value to the adjustment heater control value, from a sector position which is before by the set sector number and maintains the control value when the head reaches a target sector so as to perform read heating;

a heater control value measurement unit which, upon desired correction, measures a contact heater control value when the head is brought into contact with a medium surface while gradually increasing the adjustment heater control value from a predetermined initial value, sets the initial value to the adjustment heat control value, and sets the value, which is obtained by subtracting a minimum clearance heater control value corresponding to a predetermined minimum clearance and the initial value from the contact heater control value, as a base heater control value; and a write assist adjustment unit which adjusts the adjustment heater control value measured by the heater control value measurement unit to a heater control value which improves characteristic deterioration immediately after recording is started wherein preheating is switched to write heating.

18. The control device of the storage apparatus according to claim 1, characterized in that the parameter administration unit registers and administers a base heater electric power value, which is supplied to the heater upon preheating, recording, and reproduction and an adjustment heater electric power value, which is supplied to the heater upon preheating and reproduction except for recording;

upon recording, the write clearance control unit performs preheating by electric power distribution to the heater by an electric power value, which is obtained by adding the base heater electric power value to the adjustment heater electric power value, from a sector position before by a predetermined set sector number and performs write heating by switching the electric power distribution to that by the base heater electric power value when the head reaches a target sector;

upon reproduction, the read clearance control unit performs preheating by electric power distribution to the heater by the electric power value, which is obtained by adding the base heater electric power value to the adjustment heater electric power value, from a sector position before by the set sector number and performs read heating by maintaining the electric power value when the head reaches a target sector;

upon desired correction, the heater electric power value measurement unit measures a contact heater electric power value when the head is brought into contact with a medium surface while gradually increasing the adjustment heater electric power value from a predetermined initial value, sets the initial value as an adjustment heat electric power value, and sets a value, which is obtained by subtracting a minimum clearance heater electric power value corresponding to a predetermined minimum clearance and the initial value from the contact heater electric power value, as the base heater electric power value; and the write assist adjustment unit adjusts the adjustment heater electric power value measured by the heater electric power value measurement unit to a heater electric power value which improves characteristic deterioration immediately after recording is started wherein preheating is switched to write heating.

19. The control method of the storage apparatus according to claim 11, characterized in that, in the parameter administration step, a base heater electric power value, which is supplied to the heater upon preheating, recording, and reproduction and an adjustment heater electric power value, which is supplied to the heater upon preheating and reproduction except for recording, are registered and administered;

upon recording, in the write clearance control step, preheating is performed by electric power distribution to the heater by an electric power value, which is obtained by adding the base heater electric power value to the adjustment heater electric power value, from a sector position before by a predetermined set sector number and write heating is performed by switching the electric power distribution to that by the base heater electric power value when the head reaches a target sector;

upon reproduction, in the read clearance control step, preheating is performed by electric power distribution to the heater by the electric power value, which is obtained by adding the base heater electric power value to the adjustment heater electric power value, from a sector position before by the set sector number and read heating is performed by maintaining the electric power value when the head reaches a target sector; upon desired correction, in the heater electric power value measurement step, a contact heater electric power value when the head is brought into contact with a medium surface is measured while gradually increasing the adjustment heater electric power value from a predetermined initial value, the initial value is set as an adjustment heat electric power value, and a value, which is obtained by subtracting a minimum clearance heater electric power value corresponding to a predetermined minimum clearance and the initial value from the contact heater electric power value, is set as the base heater electric power value; and, in the write assist adjustment step, the adjustment heater electric power value measured by the heater electric power value measurement unit is adjusted to a heater electric power value which improves characteristic deterioration immediately after recording is started wherein preheating is switched to write heating.

20. A control device of the storage apparatus according to claim 17, characterized in that the parameter administration unit registers and administers a base heater electric power value, which is supplied to the heater upon preheating, recording, and reproduction and an adjustment heater electric power value, which is supplied to the heater upon preheating and reproduction except for recording;

upon recording, the write clearance control unit performs preheating by electric power distribution to the heater by an electric power value, which is obtained by adding the base heater electric power value to the adjustment heater electric power value, from a sector position before by a predetermined set sector number and performs write heating by switching the electric power distribution to that by the base heater electric power value when the head reaches a target sector;

upon reproduction, the read clearance control unit performs preheating by electric power distribution to the heater by the electric power value, which is obtained by adding the base heater electric power value to the adjustment heater electric power value, from a sector position before by the set sector number and performs read heating by maintaining the electric power value when the head reaches a target sector;

upon desired correction, the heater electric power value measurement unit measures a contact heater electric power value when the head is brought into contact with a medium surface while gradually increasing the adjustment heater electric power value from a predetermined initial value, sets the initial value as an adjustment heat electric power value, and sets a value, which is obtained by subtracting a minimum clearance heater electric power value corresponding to a predetermined minimum clearance and the initial value from the contact heater electric power value, as the base heater electric power value; and the write assist adjustment unit adjusts the adjustment heater electric power value measured by the heater electric power value measurement unit to a heater electric power value which improves characteristic deterioration immediately after recording is started wherein preheating is switched to write heating.

* * * * *